United States Patent
Jonnalagadda et al.

(10) Patent No.: US 10,771,380 B2
(45) Date of Patent: Sep. 8, 2020

(54) FAST CONTROL PATH AND DATA PATH CONVERGENCE IN LAYER 2 OVERLAY NETWORKS

(71) Applicant: TELEFONAKTIEBOLAGET LM ERICSSON (PUBL), Stockholm (SE)

(72) Inventors: V. S. Jagannadham (Jack) Jonnalagadda, Menlo Park, CA (US); Sajjad Ahmed, Cupertino, CA (US); Antoni Przygienda, Sunnyvale, CA (US); Pramodh D'Souza, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2 days.

(21) Appl. No.: 16/317,532

(22) PCT Filed: Jul. 25, 2016

(86) PCT No.: PCT/IB2016/054428
§ 371 (c)(1),
(2) Date: Jan. 11, 2019

(87) PCT Pub. No.: WO2018/020290
PCT Pub. Date: Feb. 1, 2018

(65) Prior Publication Data
US 2019/0245779 A1    Aug. 8, 2019

(51) Int. Cl.
*H04L 12/703* (2013.01)
*H04L 12/46* (2006.01)
(Continued)

(52) U.S. Cl.
CPC .......... *H04L 45/28* (2013.01); *H04L 12/4641* (2013.01); *H04L 45/22* (2013.01);
(Continued)

(58) Field of Classification Search
CPC ..... H04L 45/28; H04L 12/4641; H04L 45/22; H04L 45/32; H04L 45/507; H04L 45/64; H04L 45/66; H04L 61/6077; H04L 45/16
See application file for complete search history.

(56) References Cited

U.S. PATENT DOCUMENTS 8,717,895 B2 *  5/2014  Koponen ................ H04L 49/00
                                                      370/235
10,237,174 B2 * 3/2019  Hao ........................ H04L 69/22
(Continued)

OTHER PUBLICATIONS

International Search Report and Written Opinion for Application No. PCT/IB2016/054428, dated Mar. 21, 2017, 11 pages.

*Primary Examiner* — Wutchung Chu
(74) *Attorney, Agent, or Firm* — Sage Patent Group

(57) ABSTRACT

Methods and apparatuses for fast convergence in Layer 2 overlay network are described. Forwarding of Layer 2 (L2) traffic addressed to one or more remote L2 destinations is performed according to a remote L2 (RL2) instance, where the RL2 instance identifies a primary path for forwarding the traffic towards the remote L2 destinations, and a provider edge service label (PESL) instance associated with a broadcast domain including one or more network devices for forwarding the L2 traffic towards the L2 destination, and where the PESL instance is identified with a unique immutable PESL instance label. In response to a network event, an update of the RL2 instance is performed. The update results in an update of a data plane for forwarding the L2 traffic without necessitating an update of forwarding table entries for each one of the one or more remote L2 destination.

14 Claims, 15 Drawing Sheets

(51) Int. Cl.
*H04L 12/715* (2013.01)
*H04L 12/721* (2013.01)
*H04L 12/707* (2013.01)
*H04L 12/723* (2013.01)
*H04L 29/12* (2006.01)
*H04L 12/761* (2013.01)

(52) U.S. Cl.
CPC ............ *H04L 45/32* (2013.01); *H04L 45/507* (2013.01); *H04L 45/64* (2013.01); *H04L 45/66* (2013.01); *H04L 61/6077* (2013.01); *H04L 45/16* (2013.01)

(56) References Cited

U.S. PATENT DOCUMENTS

| | | | |
|---|---|---|---|
| 2006/0010250 A1* | 1/2006 | Eisl | H04L 61/2084 709/245 |
| 2009/0238084 A1* | 9/2009 | Nadeau | H04L 43/10 370/248 |
| 2009/0319684 A1* | 12/2009 | Kakivaya | H04L 29/12066 709/238 |
| 2012/0075988 A1* | 3/2012 | Lu | H04L 41/0654 370/218 |
| 2012/0182990 A1* | 7/2012 | Cao | H04L 45/50 370/389 |
| 2013/0058357 A1* | 3/2013 | Koponen | H04L 49/00 370/412 |
| 2013/0107699 A1* | 5/2013 | Miclea | H04L 45/28 370/228 |
| 2014/0241247 A1* | 8/2014 | Kempf | H04L 12/4641 370/328 |
| 2014/0269261 A1* | 9/2014 | D'Souza | H04L 41/0668 370/225 |
| 2014/0321269 A1* | 10/2014 | Sugawara | H04L 41/0668 370/228 |
| 2014/0327680 A1* | 11/2014 | Hoppe | G06F 3/048 345/473 |
| 2015/0120978 A1* | 4/2015 | Kalyanasundharam | G06F 12/0815 710/267 |
| 2015/0128287 A1* | 5/2015 | LaFever | H04L 63/0407 726/27 |
| 2015/0379303 A1* | 12/2015 | LaFever | G06F 21/6254 726/28 |
| 2016/0028625 A1* | 1/2016 | Hari | H04L 45/74 370/392 |
| 2017/0099216 A1* | 4/2017 | Hao | H04L 47/781 |
| 2017/0353382 A1* | 12/2017 | Gupta | H04L 45/28 |
| 2018/0006995 A1* | 1/2018 | Bickhart | H04L 45/66 |

\* cited by examiner

US 10,771,380 B2

FAST CONTROL PATH AND DATA PATH CONVERGENCE IN LAYER 2 OVERLAY NETWORKS

CROSS-REFERENCE TO RELATED APPLICATIONS

This application is a National stage of International Application No. PCT/IB2016/054428, filed Jul. 25, 2016, which is hereby incorporated by reference.

TECHNICAL FIELD

Embodiments of the invention relate to the field of packet networks; and more specifically, to the convergence of control path and data path in Layer 2 overlay networks.

BACKGROUND

Data center solutions have been aggressively adopting Layer 2 (L2) based architectures to solve interconnectivity problems and provide new services to users. Standard Layer 2 forwarding models do not enable multiple active links to forward Layer 2 traffic between interconnected network devices, and typically block all but one link to forward data in scenarios where multiple links connect two network devices. New Layer 2 overlay technologies, such as Ethernet Virtual Private Network (EVPN), introduce new forwarding models that need multi-homing forwarding in which two network devices are coupled through a plurality of links. These models propose that network devices operate in either an all-active mode, where all links are active, or in a single-active mode (where a single one of the links is active and the other links are in a standby status). The L2 overlay deployments further mandate the support of failure detection mechanisms and re-route of the associated L2-destinations over alternate paths. The failure detection and reroute mechanism need to scale well to avoid increased long convergence times of the control plane (in reroute cases) when L2 and Layer 3 technologies are used in combination (e.g., as proposed in EVPN).

In scenarios where a network device is multi-homed, load spreading among links that can reach the multi-homed L2 destination is not possible with current technologies. In addition, in technologies such as Virtual Private LAN Service (VPLS) a Layer 2 destination address (e.g., a Media Access Control (MAC) address) can only be learned over one pseudo-wire and hence use of multiple links is not feasible where the destination is multi-homed in a VPLS environment.

Existing Layer 2 overlay solutions do not support use of multiple paths to reach active L2 destinations. In addition, current solutions do not permit the configuration of a primary path and a set of alternate paths to reach a given L2 destination. Further, in a case of failure within the path towards the L2 destination, the existing reroute mechanisms result in the update of the routes to each L2 destination in the forwarding plane. However, an update per L2 destination can cause severe synchronization and convergence delays in the network.

SUMMARY

Methods and apparatuses for fast control path and data path convergence in Layer 2 overlay networks are described. One general aspect includes a method for fast convergence in Layer 2 overlay network. The method includes causing a forwarding of Layer 2 (L2) traffic addressed to one or more remote L2 destinations according to a remote L2 (RL2) instance, where the RL2 instance identifies a primary path for forwarding the traffic towards the remote L2 destinations, and a provider edge service label (PESL) instance associated with a broadcast domain including one or more network devices for forwarding the L2 traffic towards the L2 destination, and where the PESL instance is identified with a unique immutable PESL instance label; and causing, in response to a network event, an update of the RL2 instance that results in an update of a data plane for forwarding the L2 traffic without necessitating an update of forwarding table entries for each one of the one or more remote L2 destination.

In one embodiment, causing, in response to a network event, the update of the RL2 instance includes: determining a unique immutable RL2 instance handle identifying the RL2 instance associated with the one or more L2 destinations; and causing an update of the data plane based on the unique immutable RL2 instance handle.

One general aspect includes a non-transitory computer readable storage medium that provide instructions, which when executed by one or more processors, cause the one or more processors to perform operations enabling a fast control path and data path convergence in Layer 2 overlay networks. The operations includes causing a forwarding of Layer 2 (L2) traffic addressed to one or more remote L2 destinations according to a remote L2 (RL2) instance, where the RL2 instance identifies a primary path for forwarding the traffic towards the remote L2 destinations, and a provider edge service label (PESL) instance associated with a broadcast domain including one or more network devices for forwarding the L2 traffic towards the L2 destination, and where the PESL instance is identified with a unique immutable PESL instance label; and causing, in response to a network event, an update of the RL2 instance that results in an update of a data plane for forwarding the L2 traffic without necessitating an update of forwarding table entries for each one of the one or more remote L2 destination.

In one embodiment, causing, in response to a network event, the update of the RL2 instance includes: determining a unique immutable RL2 instance handle identifying the RL2 instance associated with the one or more L2 destinations; and causing an update of the data plane based on the unique immutable RL2 instance handle.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
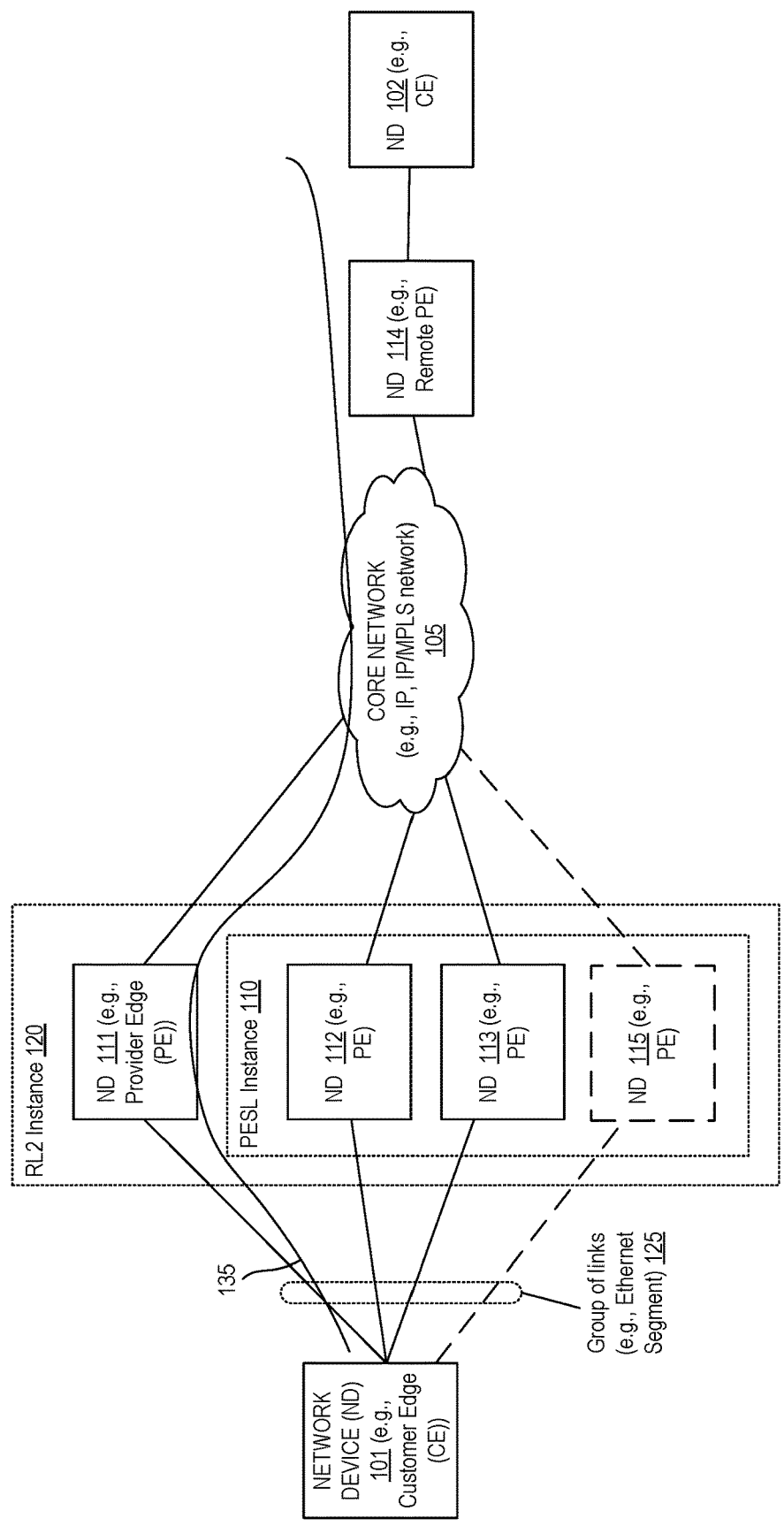
FIG. 1 illustrates a block diagram of an exemplary network for forwarding of packets in a Layer 2 overlay network in accordance with some embodiments.

The following description describes methods and apparatus for fast control path and data path convergence in Layer 2 overlay networks. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Systems and methods for achieving fast control path and data path convergence in Layer 2 (L2) overlay networks are described. The embodiments present methods and systems that are independent of the Layer 2 forwarding table size and that achieve Layer 2 data forwarding over multiple paths (e.g., in an all-active and/or single-active forwarding models) in Layer 2 overlay networks. The present embodiments enable the use of reachability of L2 destinations via multiple paths by introducing new forwarding plane constructs. These new constructs enable control plane convergence independent of the number of associated Layer 2 destination when failure is detected and also to data plane convergence and re-routing in data-plane before the convergence of the control plane and the update of the data plane with optimal routes after the control plane convergence. Thus the solution presented herein enable a multi-way forwarding in an L2 domain, which allows for forwarding packets through more than one path towards an L2 destination. The forwarding constructs enable scenarios in which all the paths can be active all the time or alternatively scenarios in which alternate paths (such as non-primary paths) can operative in a standby mode.

In one embodiment of the invention, a first forwarding construct, which is referred to herein as Provider Edge Service Label (PESL), is introduced. In another embodiment of the invention, a second forwarding construct is introduced, which will be referred to herein as RL2. In some embodiments, the PESL and RL2 forwarding construct are used in combination to support multi-homed Layer 2 forwarding in Layer 2 overlay networks.

FIG. 1 illustrates a block diagram of an exemplary network for forwarding of packets in a Layer 2 overlay network, according to some embodiments of the invention. FIG. 1 illustrates an exemplary network 100 including a set of network devices (NDs). For example, the network 100 includes a set of NDs 111, 112, 113 and 114 and a set of NDs 101-102. In some embodiments, the NDs 101 and 102 are customer edge (CEs) network devices coupled with Provider Edge network devices NDs 111, 112, 113 and 114 of a provider's network. These NDs represent connection points in the network in which a customer's site (e.g., a data center, customer's network, computing device, etc.) connects with a provider's network. One of ordinary skill in the art would understand that the number of NDs in network 100 are exemplary only and not intended to be limiting. A network 100 may include any number of network devices. Each one of the NDs 111-114 and 101-102 can be implemented as described in further details with reference to FIGS. 11A-12.

Each one of the NDs 101-102 may be a host, a router, or a switch coupled with one or more customer sites (not shown in FIG. 1). The NDs 111-114 provide virtual Layer 2 bridged connectivity between NDs 101-102. The NDs 111-114 are coupled through a network 105. For example, the NDs can be coupled through an MPLS Label Switched Path (LSP) infrastructure, which provides the benefits of MPLS technology, such as fast reroute, resiliency, etc. In other embodiments, the NDs 111-114 may be connected by an IP infrastructure, in which case IP/GRE (Generic Routing Encapsulation) tunneling or other IP tunneling can be used between the NDs.

A broadcast domain is a set of network devices associated with a broadcast ID, which is operative to receive packets identified in part based on that broadcast ID. For example, a broadcast domain may correspond to a Virtual Local Area Network (VLAN), where a VLAN is typically represented by a single VLAN ID (VID). In some embodiments, a broadcast domain can be represented by several VIDs where Shared VLAN Learning (SVL) is used. In some embodiments, the network 100 may support Ethernet Virtual Private Network (EVPN), in which an EVPN instance may include one or more broadcast domains. In the illustrated exemplary system of FIG. 1, the EVPN instance includes a single broadcast domain. Some embodiments can be implemented such that an EVPN instance may include multiple broadcast domains, each domain being identified with a corresponding broadcast ID without departing from the scope of the present invention. The EVPN instance is associated with an identifier that uniquely identifies the instance and may be referred to as EVI.

Each one of the NDs 101-102 can connect to multiple active points of attachment (i.e., to multiple PEs). For example, ND 101 is coupled with ND 111, ND 112, and ND 113 through a group of links 125. The group of link includes a first link coupling ND 101 with ND 111, a second link coupling ND 101 with ND 112, and a third link coupling ND 101 with ND 113. The group of links is associated with a unique non-zero identifier. In some embodiments, the group of link is an Ethernet segment and is associated with an Ethernet Segment Identifier (ESI). The group of links can operate in a "Single-Active Redundancy Mode," where only a single ND from the NDs 111-113 is allowed to forward traffic through that Ethernet segment. Alternatively the group of links 125 may operate in a "All-Active Redundancy Mode," where all NDs 111-113 attached to the group of links are allowed to forward traffic through that Ethernet segment.

ND 102 is an example of a multi-homed Layer 2 destination, such as traffic forwarded from ND 101 can be forwarded towards ND 102 towards multiple paths. For example, an L2 packet is processed at ND 101 to be forwarded towards destination ND 102 via the provider's network formed of the PEs 111-114 and the network 105.

Forwarding Construct for Multi-Homed Layer 2 Destinations:

The embodiments introduce a new forwarding construct, PESL, for enabling support of multi-homing in Layer 2 overlay deployments. A PESL instance is defined by a list of PEs (e.g., ND 112-113), their respective forwarding labels associated with each PE (that are used to reach the PE) and the transport paths to the PEs over a core network (e.g., the core network 105, which can for example be an IP or an IP/MPLS network). The forwarding labels are referred to herein as PESL label. In some embodiments, a PE may be part of two different broadcast domains (e.g., two different VLANs), and in a first one of these domains, the PE is part of a PESL instance. In these embodiments, the PESL label associated with the PE within the PESL instance may have a different value than a forwarding label that is associated with that same PE within the second broadcast domain. A PESL instance is associated with a unique identifier that is used to identify a given instance which is referred to herein as PESL instance handle. Further, a PESL instance identifies and groups a set of multi-homed L2 NDs 101 and 102 (e.g., a set of VLANS, a set of ports, or a set of VLAN bundle services etc.) reachable via the identified set of PEs and the paths in the core network that lead to these PEs. In FIG. 1, an exemplary PESL instance 110 including NDs 112-113 is illustrated. This instance couples NDs 101 and 102 through a Layer 2 overlay network including the providers' network devices 112-113 connected via the network 105.

The operations in the flow diagrams will be described with reference to the exemplary embodiments of FIG. 1 and FIG. 3A. However, it should be understood that the operations of the flow diagrams can be performed by embodiments of the invention other than those discussed with reference to FIG. 1 and FIG. 3A, and the embodiments of the invention discussed with reference to FIG. 1 can perform operations different than those discussed with reference to the flow diagrams.

Figure 2:
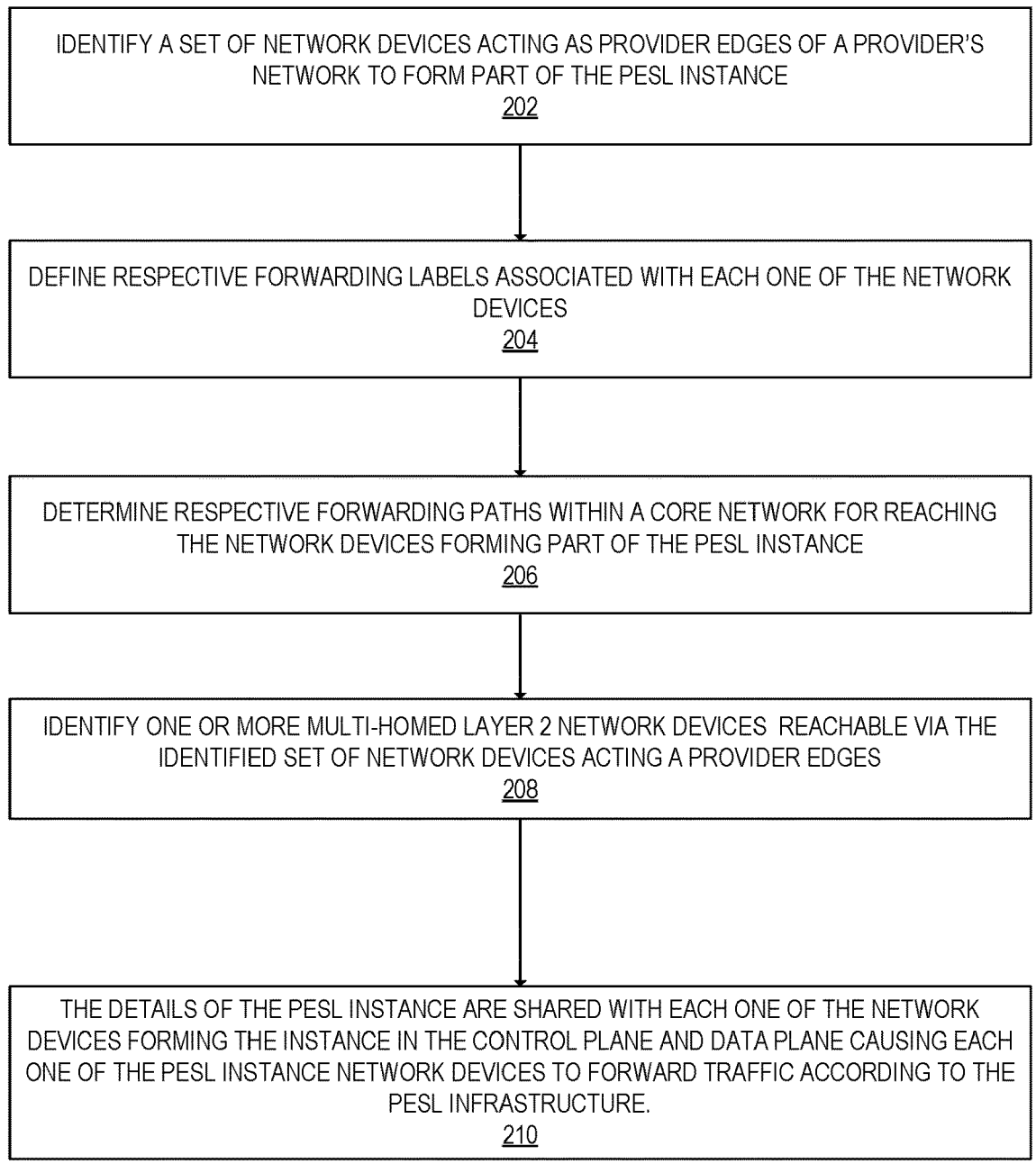
FIG. 2 illustrates a flow diagram of operations for configuring a PESL instance in accordance with some embodiments.

Configuration of a PESL Instance:

FIG. 2 illustrates a flow diagram of operations for configuring a PESL instance in accordance with some embodiments. The configuration/definition of a PESL instance is performed in the control plane. In some embodiments, more than one broadcast domain (e.g., a VLAN instance) can be reachable to a PESL instance. In other embodiments, there may be a one-to-one relation between a broadcast domain and the PESL instance. A signaling mechanism is used between the PEs (ND 112-113) of the PESL instance to learn forwarding and reachability information related to the PESL instance. For example, the signaling mechanism can employ existing protocols such as BGP or any other suitable protocol to exchange routing and reachability information.

Figure 3A:
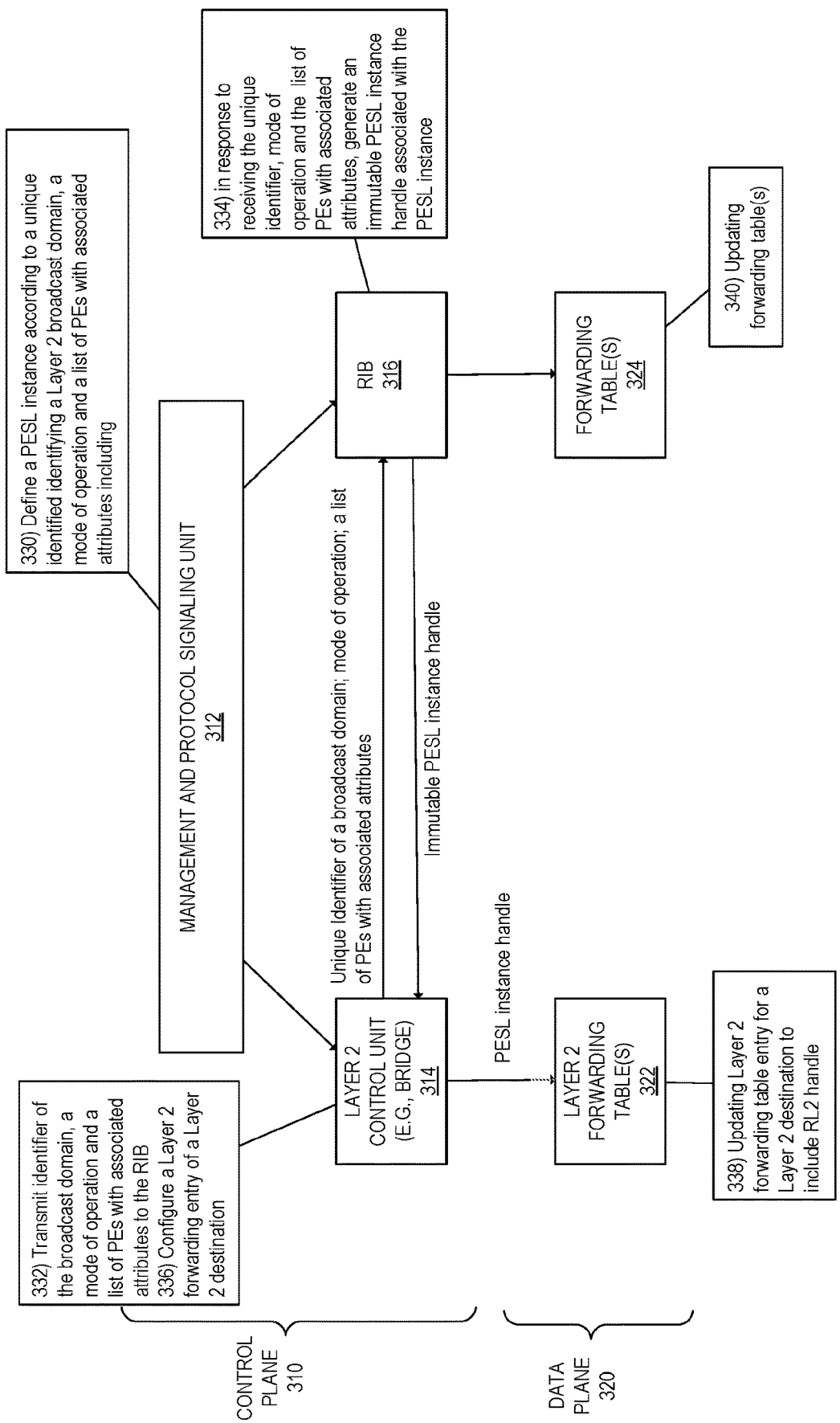
FIG. 3A illustrates a block diagram of exemplary operations for configuring a PESL instance in accordance with some embodiments.

FIG. 3A illustrates a block diagram of exemplary operations for configuring a PESL instance according to some embodiments. A management and protocol signaling unit 312 is operative to define and configure the PESL instance in a control plane. In some embodiments, the management and protocol signaling unit 312 is included within the Control Plane device 1204 of FIG. 12. At operation 330, the management and protocol signaling unit 312 defines a PESL instance according to a unique identifier identifying a broadcast domain (e.g., Ethernet Segment Identifier (ESI), EVI, VLAN ID, or any other identifier that identifies a Layer 2 broadcast domain); a mode of operation (where the mode of operation can be set to active or standby for the PESL); and a set of PE network devices and their associated attributes (e.g., forwarding labels); tunnel path information, etc.). The definition and configuration can be performed through a variety of control configuration mechanisms implemented within the management and protocol signaling unit 312. For example, the definition of PESL instance can be performed through a command line interface (CLI), a Web Interface, or a Software Defined Networking (SDN) controller.

In some embodiments, the definition of the PESL instance is performed according to operations 202-208 of FIG. 2. At operation 202, a set of PEs (e.g., ND 112-114) is identified to form part of the PESL instance. At operation 204, forwarding labels associated with each PE are defined. At operation 206, the paths to reach each one of the PEs over a core network (e.g., the core network 105) are determined. In some embodiments, the path to the PE via the core network comprises a path resolved using an IP path resolution mechanism to reach the PE. For example, the path can be resolved per IP Longest Prefix Match (LPM) or alternatively through the use of mapped service mechanisms (where the transport path to the PE uses the identified LSP path or tunnel). Further, at operation 208, a set of multi-homed L2 NDs 101 and 102 is identified, where the set of L2 NDs are reachable via the identified set of PEs and the paths in the core network that lead to these PEs.

Following the definition of a PESL instance, the attributes of the PESL instance are transmitted from the Layer 2 Control Unit 314 to obtain an immutable PESL instance handle for this PESL instance. The Layer 2 Control Unit 314 transmits (operation 332), a unique identifier identifying a broadcast domain (e.g., Ethernet Segment Identifier, EVI, VLAN ID, or any other identifier that identifies a Layer 2 broadcast domain); a mode of operation (where the mode of operation can be set to active or standby for the PESL); and a set of PE network devices and their associated attributes (e.g., PESL labels). In some embodiments, a composite API is used to associate a PESL instance with the unique immutable PESL handle, and a set of attributes of PESL. The handle is returned (operation 334) by the creator of such association (for example the RIB 316 which maintains a relation between the instance and the unique handle). Following the definition of the PESL instance and the determination of a PESL handle, the details of the PESL instance are shared, in the control plane and data plane of each one of the network devices forming the instance causing these devices to forward traffic according to the PESL infrastructure. For example, the details of the instance (i.e., the identifier associated with PESL instance, a list of PEs that are part of the instance, the paths for reaching these PEs, and associated forwarding labels) are shared with the L2 Control Unit 314 in the control plane causing the Layer 2 Control unit to configure the data plane to forward traffic according to the PESL infrastructure (for example, PESL instance handle is communicated to L2-Bridge, BGP, and other registered interests in RIB).

The Layer 2 Control Unit 314 uses the PESL instance handle to configure Layer 2 forwarding tables to include the PESL handle. At operation 334, in response to receiving a unique identifier identifying a broadcast domain; a mode of operation; and the set of PE network devices and their associated attributes, the RIB generates the unique PESL instance handle and forwards it to the Layer 2 Control Unit 314. At operation 336, the Layer 2 Control Unit 314 causes the configuration of a Layer 2 forwarding entries of the Layer 2 forwarding table(s) 322 associated with a Layer 2 destination to include the PESL instance handle. Thus for each Layer 2 destination serviced by the PESL instance, an entry for that L2 destination is updated (operation 338) to include the PESL instance handle.

Remote Layer 2 Construct:

The embodiments presented herein further introduce a second new Layer 2 forwarding construct referred to as Remote Layer 2 (or RL2) that specifies methods and system enabling reachability of multi-homed and single-homed Layer 2 destinations. The RL2 construct may be used in combination with the PESL construct for reaching multi-homed Layer 2 destination network devices.

An RL2 construct enables reachability of a remote Layer 2 destination of an L2 overlay network. For example, an RL2 instance is configured to enable reachability of ND 102 from ND 101 through the provider's network including NDs 111-114 and the network 105. In one embodiment, an RL2 instance 120 is associated with a primary path for reaching ND 102 when the instance is operating in a single-homed scenario. In other embodiments, when the instance operates in a multi-homed scenario, the RL2 instance 120 is associated with a primary path and one or more redundant paths identified by a PESL instance (e.g., PESL instance 110).

Figure 3B:
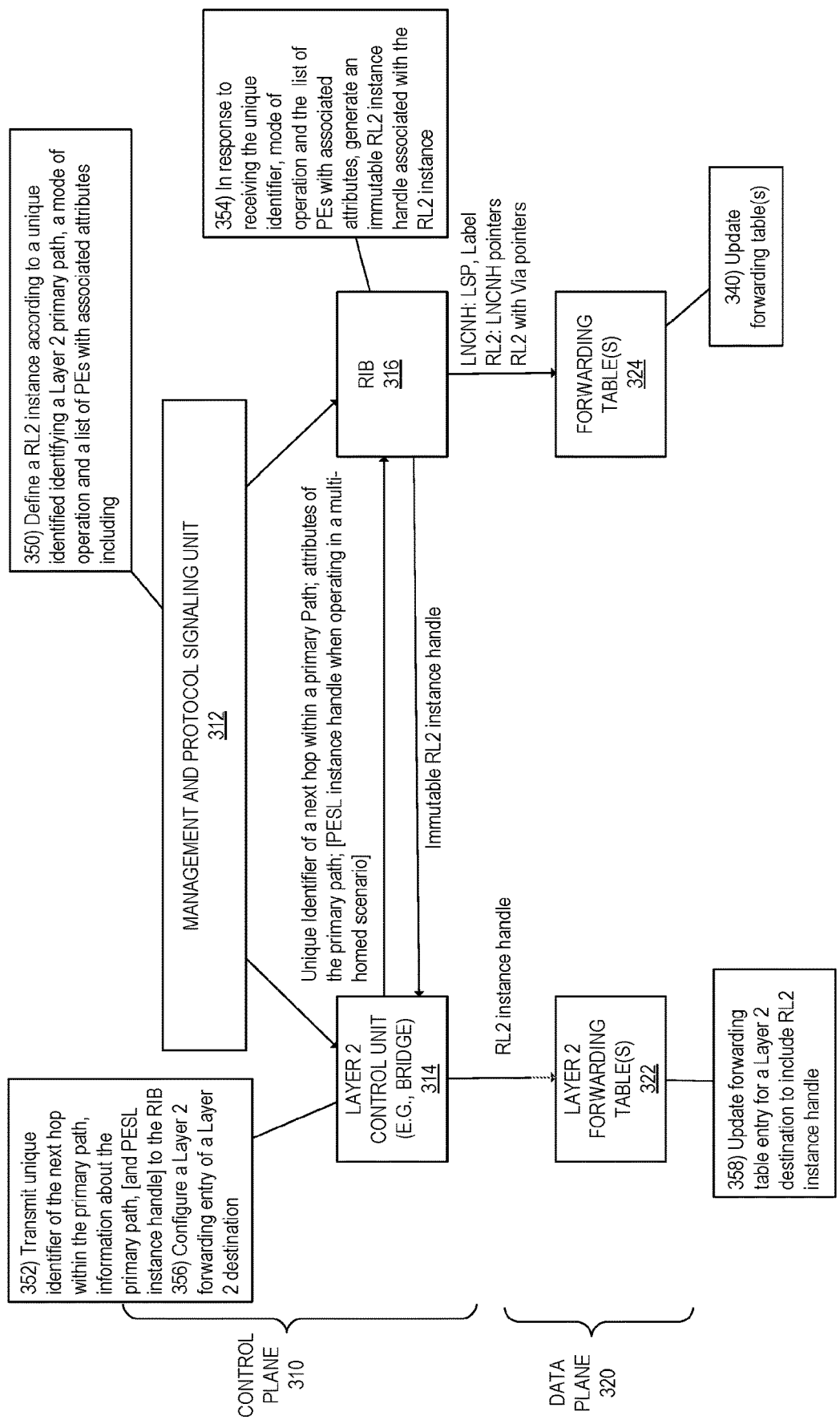
FIG. 3B is a block diagram of exemplary operations for configuring an RL2 instance in accordance with some embodiments.

FIG. 3B is a block diagram of exemplary operations for configuring an RL2 instance according to one embodiment. A management and protocol signaling unit 312 is operative to define and configure the RL2 instance in a control plane. In some embodiments, the management and protocol signaling unit 312 is included within the Control Plane device 1204 of FIG. 12. At operation 350, the management and protocol signaling unit 312 defines an RL2 instance according to a unique identifier identifying a next hop in a primary path for forwarding traffic to a Layer 2 destination (e.g., PE IP address, VPN Label, Layer 2 instance identifier (e.g., EVI), or other identifier that uniquely identifies a next hop in a primary path towards a Layer 2 destination); information about the primary path (e.g., forwarding labels, and the path within the network 105 to reach the destination, tunnel path information, etc.). In some embodiments, when the RL2 instance operates in a multi-homed scenario, a PESL instance handle is further transmitted. The definition and configuration of the RL2 instance can be performed through a variety of control configuration mechanisms implemented within the management and protocol signaling unit 312. For example, the definition of RL2 instance can be performed through a command line interface (CLI), a Web Interface, or a Software Defined Networking (SDN) controller.

Following the definition of an RL2 instance, the attributes of the RL2 instance are transmitted from the Layer 2 Control Unit 314 to obtain an immutable RL2 instance handle for this instance. The Layer 2 Control Unit 314 transmits (operation 352), a unique identifier identifying a next hop in a primary path towards the L2 destination network device (e.g., PE IP address, EVI, VLAN ID, or any other identifier that identifies a next hop within a primary path to the L2 destination); information about the primary path. In some embodiments, the L2 Control Unit 314 further transmits a PESL instance handle identifying a PESL instance to be used in a multi-homed Layer 2 destination scenario. In some embodiments, a composite API is used to associate an RL2 instance with the unique immutable RL2 handle, and a set of attributes of RL2. The handle is returned (operations 354) by the creator of such association (for example the RIB 316 which maintains relations between the instances and their associated unique handles).

Following the definition of the RL2 instance and the determination of an RL2 handle, the details of the RL2 instance are shared, in the control plane and data plane of each one of the network devices forming the instance causing these devices to forward traffic according to the RL2 infrastructure. For example, the details of the instance (i.e., the identifier associated of the next hop in the primary path, the information about the primary path, and associated PESL instance handle) are shared with the L2 Control Unit 314 in the control plane causing the Layer 2 Control unit to configure the data plane to forward traffic according to the RL2 infrastructure (For example, the information is transmitted to an L2-bridge instance, BGP, or to any registered interest in RIB).

The Layer 2 Control Unit 314 uses the RL2 instance handle to configure Layer 2 forwarding tables to include the RL2 handle. At operation 334, in response to receiving a unique identifier; information about the primary path and a PESL instance handle in some embodiments, the RIB generates the unique RL2 instance handle and forwards it to the Layer 2 Control Unit 314. At operation 336, the Layer 2 Control Unit 314 causes the configuration of a Layer 2 forwarding entries of the Layer 2 forwarding table(s) 322 associated with a Layer 2 destination to include the RL2 instance handle. Thus for each Layer 2 destination serviced by the RL2 instance, an entry for that L2 destination is updated (operation 338) to include the RL2 instance handle.

As will be described in further details below, an RL2 instance is used to forward traffic to a Layer 2 destination according to single-homed or multi-homed scenarios. The RL2 instance can be dynamically updated to forward traffic according to one or the other mode of operations (single-homed vs. multi-homed). To enable a dynamic update of the control plane and data plane of the forwarding paths towards the Layer 2 destination, the RL2 instance is used in combination with a PESL instance. The embodiments below will be described with reference to FIG. 1 and/or FIG. 4 and Layer 2 destination ND 102 or L2 destination ND 402. However, the embodiments are not so limited and typically ND 114 and ND 414 are coupled with multiple customer equipment devices (100000s to millions of devices).

Figure 4:
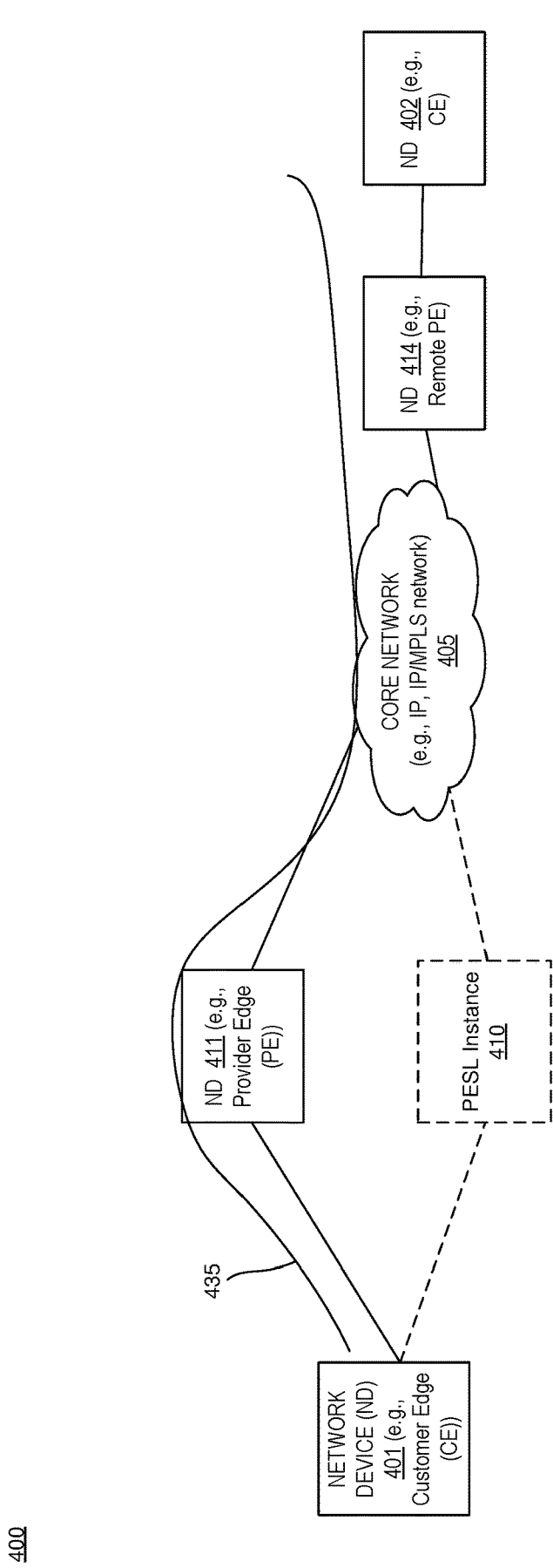
FIG. 4 illustrates an exemplary block diagram in which a Layer 2 destination is single-homed in accordance with some embodiments.
Figure 5:
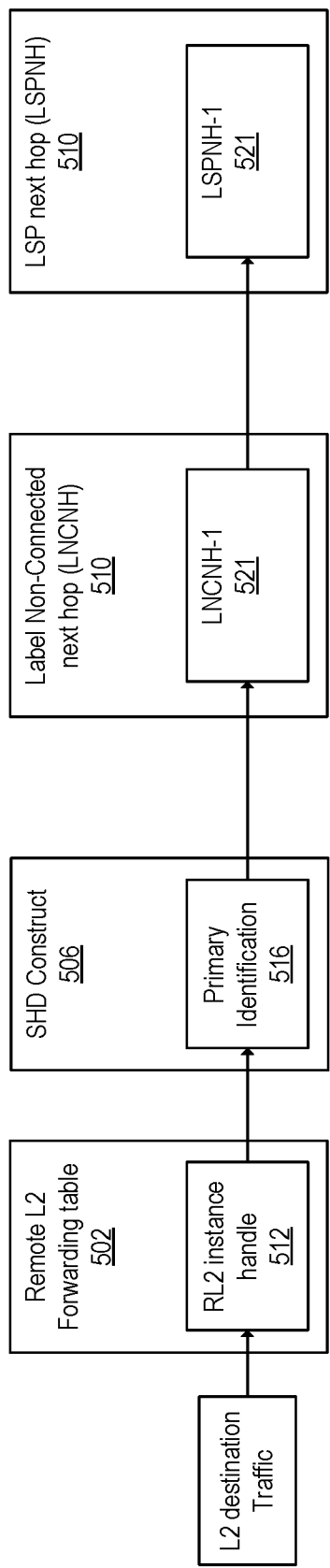
FIG. 5 illustrates an exemplary scenario in which Layer 2 traffic is forwarded in a single-homed mode in accordance with some embodiments.

Forwarding Traffic to a Layer 2 Destination According to RL2 and PESL:

FIG. 4 illustrates an exemplary block diagram in which a Layer 2 destination is single-homed in accordance with some embodiments. The Layer 2 destination ND 402 is accessible to ND 401 via a single path coupling ND 411 to ND 414 in the L2 Overlay network 400. In some embodiments, ND 405 may have transitioned from a multi-home mode to the single-homed mode. In other embodiments, ND 405 may have been configured to operate in the single-homed mode without having transitioned from the multi-homed mode. In the illustrated example of FIG. 4, ND 401 is forwarded to ND 405 according to an RL2 instance associated with the primary path 435. Thus, the RL2 instance is associated with a unique handle identifying the RL2 instance and is configured in the control plane to include the ND 411 and associated attributes of the ND 411 for forwarding traffic towards the L2 destination ND 402. FIG. 5 illustrates an exemplary scenario in which L2 traffic is forwarded in a single-homed mode in accordance with some embodiments. Upon receipt of traffic destined to L2 destination ND 402, a Remote L2 forwarding table 502 is looked up with the L2 destination address. An entry of the L2 forwarding table includes an action to forward the traffic to the RL2 instance identified with the RL2 instance handle. In this embodiment, the RL2 instance handle is then used in a second forwarding table '06 which, in this case, directs the traffic towards the primary path of the RL2 instance and identifies a Label Non-Connected Next hop (LNCNH) of a next hope within the primary path. Following the determination that the traffic is to be forwarded towards the primary path of the RL2 instance, the packets are encapsulated in a Label Switched Path (LSP) Next Hop (LSPNH) Label to be forwarded towards the L2 destination.

In one embodiment, when the RL2 instance transitions from a multi-homed mode to a single-homed mode of operation in which, the RL2 instance was associated with a PESL instance 410, the control plane is updated to remove an association between the RL2 instance handle and the PESL instance handle. The immutable handle of the RL2 instance and the immutable handle of the PESL instance 410 enable the efficient update of control plane and the forwarding plane when a change in the mode of operations occurs.

Figure 6:
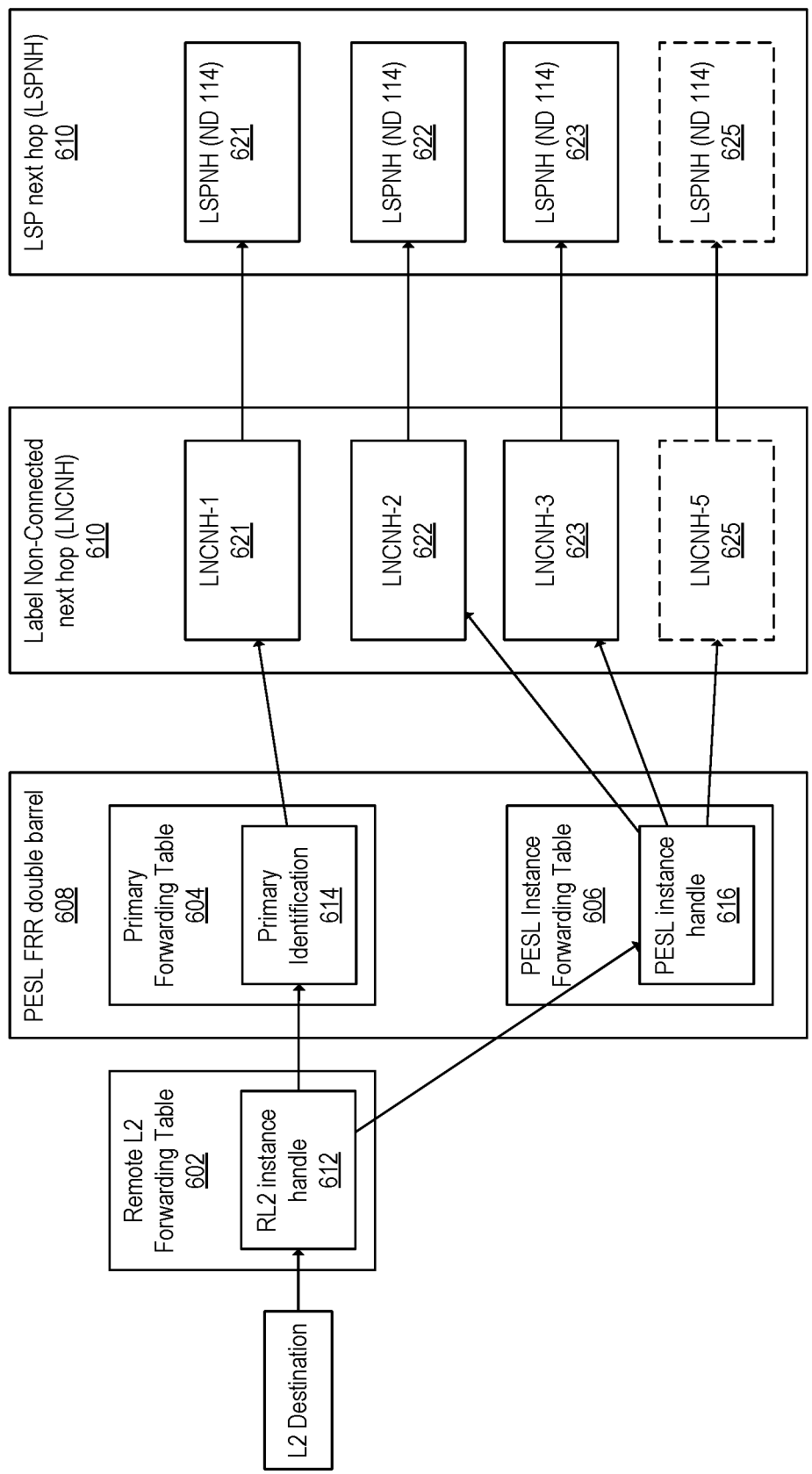
FIG. 6 illustrates an exemplary forwarding construct for forwarding traffic to a multi-homed Layer 2 destination in a single-active mode in accordance with some embodiments.

Forwarding to a Multi-Homed L2 Destination:

FIG. 6 illustrates an exemplary forwarding construct for forwarding traffic to a multi-homed Layer 2 destination in a single-active mode in accordance with some embodiments. The RL2 instance and the PESL instance are used in combination to provide a multi-homed L2 destination structure. When the mode of operation is set to a single-active mode (such that only a single one of the links is used to transmit packet to the Layer 2 destination at a given time), the PESL instance is used to provide redundant paths in addition to a primary path identified in an RL2 instance for forwarding traffic to the Layer 2 destination network device.

Forwarding of a packet is performed according to the RL2 instance and the PESL instance as illustrated with respect to FIG. 6. When the L2 packet destined to L2 destination is received, a lookup is performed in the Remote L2 forwarding table 602 to retrieve the Remote Layer 2 instance handle 612 associated with the Layer 2 destination. This handle is then used to determine an identification of a primary 614 path through which traffic is forwarded when the primary path is reachable (i.e., no failure occurred in the path).

The RL2 instance handle 612 is also used to retrieve the PESL instance handle 616 associated with the PESL instance 110. In one embodiment, the RL2 instance is built over a Fast Reroute (FRR) Double Barrel which resolves over a primary path 135 and a PESL instance 110 identified according to a PESL instance handle. The PESL can operate in a single-active mode or in an all-active mode. When the PESL instance 110 is in a single-active mode, it remains in a standby status until a failure or non-reachability of the primary path 135 is detected. In the standby status, the PESL instance does not forward any traffic for the L2 destination. Alternatively, when non-reachability of the primary path 135 is detected, the PESL instance transitions into an active status such that traffic is flooded through all the NDs of the PESL instance 110.

Once the primary path and the PESL instance are identified, the primary identifier and the PESL instance handle are used to determine respective forwarding labels for non-connected next hops (LNCNH). The LNCNH-2, LNCNH-3 and LNCNH-5 are PESL labels respectively associated with ND 112, ND 113, and ND 115 for reaching these NDs. These labels are then used to determine a Label Switched Path (LSP) next hop (LSPNH) labels for each one of the non-connected next hops. In the exemplary embodiment of FIG. 1 and FIG. 6, the LSPNH is a label associated with the ND 114 that is coupled with the ND 102. In a single-active mode, the alternative paths (i.e., PESL instance) become active after the failure detection of the primary path. In this scenario, the PESL instance operating in a single-active mode can operate either in a standby status (such as traffic is forwarded towards the destination ND via the primary path only) or in an active status when the primary path is not reachable. When the primary path 135 is not reachable the PESL instance is set to operate in the active status and the data destined to the Layer 2 destination ND is flooded to all the PESL NDs (e.g., ND 112-113) until a new primary path is available for that Layer 2 destination ND. In one embodiment, the mode of operation can be indicated on the PESL instance by an attribute (such as setting a bit or an attribute associated with the PESL instance handle). In another embodiment, the mode of operation of the PESL instance is indicated by associating all entries with a flood-adjacency that includes a list of all PEs and desired encapsulation (i.e., LNCNH) on every constituent of PESL to achieve flooding of traffic to all constituent of the PESL instance (ND 112-113).

Figure 7:
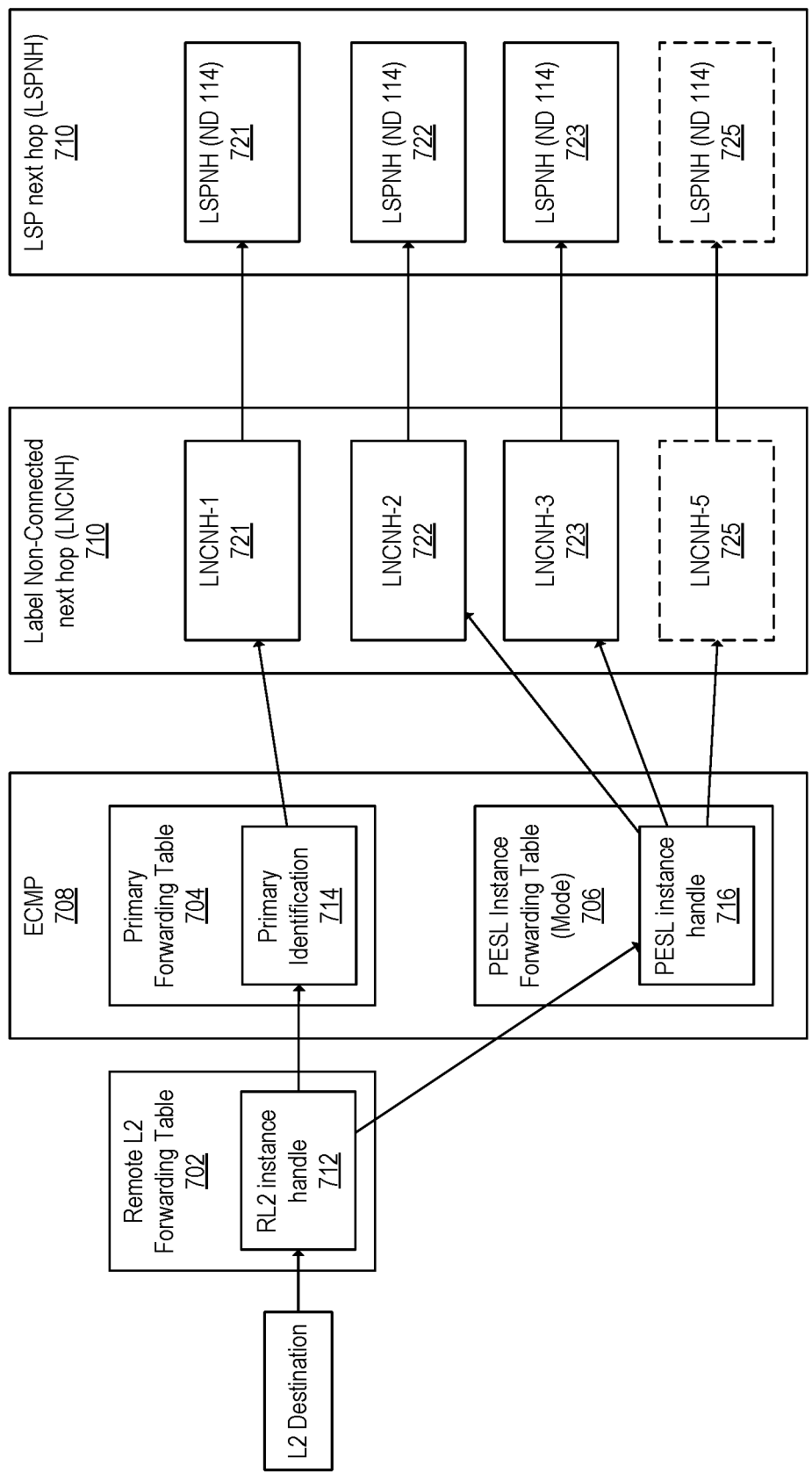
FIG. 7 illustrates an exemplary forwarding construct for forwarding traffic to a multi-homed Layer 2 destination in an all-active mode in accordance with some embodiments.

FIG. 7 illustrates an exemplary forwarding construct for forwarding traffic to a multi-homed Layer 2 destination in an all-active mode in accordance with some embodiments. In the all-active mode, L2 traffic is forwarded towards L2 destination ND 102 over the primary path 135 as well as the network devices that are part of the PESL instance. A given data packet to a known L2 destination is sent on one of the links only (i.e., a single copy of a packet is sent across the core network on either the primary path or one of the alternate paths that form the PESL instance). The mode of operations (all-active) may be determined by configuring the PESL instance or during the exchange of signaling data between the network devices forming the PESL instance following the completion of the configuration and/or the addition of a network device to the PESL instance. In some embodiments, the mode of operation can be changed dynamically as will be described in further details below.

A PESL instance set to operate in all-active mode operates similarly to Equal Cost Multi-Path Routing (ECMP). Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multi-path forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down. At runtime, a hashing algorithm can be used to load balance the packets on one of the primary path or an alternate path (towards one of the NDs forming the PESL instance). In one embodiments, the fields used to perform the hashing algorithms can be controlled by policy and access control lists (ACLs) that interface with packet classification engine. In some embodiments, a configuration can assign weights to the constituent PEs of a PESL instance such that distribution of traffic over the components of the PESL is performed according to these weights. Referring back to FIG. 3A, a composite API can be used to configure each PE of the PESL instance with a respective weight, which determines the distribution of traffic within the PESL instance.

When traffic is received, a look up is performed in the RL2 forwarding table 702 to determine an RL2 instance handle of the RL2 instance. The RL2 instance handle is used to determine a primary path and a PESL instance associated with the RL2 handle. Once the primary path and the PESL instance are identified, the primary identifier and the PESL instance handle are used to determine respective forwarding labels for non-connected next hops (LNCNH). The LNCNH-2, LNCNH-3 and LNCNH-5 are PESL labels respectively associated with ND 112, ND 113, and ND 115 for reaching these NDs. These labels are then used to determine a Label Switched Path (LSP) next hop (LSPNH) labels for each one of the non-connected next hops. In the exemplary embodiment of FIG. 1 and FIG. 6, the LSPNH is a label associated with the ND 114 that is coupled with the ND 102. In a single-active mode, the alternative paths (i.e., PESL instance) become active after the failure detection of the primary path. In this scenario, the PESL instance operating in an all-active mode operates in an ECMP mode distributing traffic across the different PEs of the PESL instance. When the primary path 135 is not reachable traffic is distributed over the components of the PESL instance.

In some embodiments, when RL2 and PESL construct are used in combination, a primary path of an RL2 instance associated with a PESL instance of a first broadcast domain (e.g., a first VLAN) can include a PE that is part of a second PESL instance associated with another domain (e.g., a second VLAN). For example, a broadcast domain BD1 (e.g., a first VLAN) can be associated with a primary path PP1 towards a Layer 2 destination and with a first PESL instance PESL 1. The next hop PE that is part of the PP1 can further be part of a second PESL instance PESL-2 associated with another broadcast domain BD2 (e.g., a second VLAN). For example, ND 112 may be a primary path of another broadcast domain (not illustrated) while being part of PESL instance 110. In these embodiments, the second PESL instance should not include the PE for primary-path for forwarding L2 traffic in the data plane. Various approaches can be used to ensure that the PE of the primary path is not included in the second PESL instance.

In a first embodiment, prior to adding a PE (e.g., ND 112) to a PESL instance (instance 110) associated with a first broadcast domain (BD1), a determination of whether the PE is acting as a next hop in a primary path of an RL2 instance associated with another broadcast domain (BD2) is performed. Thus a PE that is a next hop in a primary path is excluded from a PESL instance. Given that a PE have a first PESL label to enable reachability through the PESL instance and a second forwarding label to enable reachability of the PE as a next hop of a primary path of an RL2 instance (where the first PESL label is different from the second forwarding label), this embodiment ensures that when a PE (e.g., ND 112) is not reachable, not only it will not be reachable as a next hop of a primary path, but also as a component of a PESL.

In another embodiment, for every packet forwarded towards the PE (e.g., ND 112), both next hop of the primary path and the PESL instance are selected. In this embodiment, each PE that is part of the PESL instance (110) is associated with an index—Multi-Homed (MH)-Index. In one embodiment, the index can be 5-bit or a 6-bit index (and part of the 32-bit PESL label). For example, the index can be selected to be separate from the 20-bit label space. In some embodiments, the MH-Index in addition to a 20-bit label forms an internal label space. A path towards a multi-homed L2 destination constitutes a primary-path with primary service label and the alternative path with PESL label.

In this second embodiment, for every packet forwarded towards the L2 destination, the next hop of the primary-path (ND 112) and a path from the PESL instance are selected. In some embodiments, the PE from the PESL instance can be selected based on—a hash on L2 header fields or through configuration. The MH-Index of the selected next hop of the primary-path is compared (e.g., by performing a BIT-wise comparison, AND operation, etc.) with the MH-Index from the selected next hop within the PESL instance. If the MH-index is the same then the primary-path is used to forward traffic, otherwise the path from PESL instance is used to forward traffic to the destination. Upon detection that the primary path and the associated PE are not reachable (e.g., mechanisms such as multi-hop BFD, control protocol (such as BGP) signaling, and other remote fault detection mechanisms can be employed for the detection), the data plane overwrites the primary path with one of the paths from the PESL instance that is active. In one embodiment, a result of modulo max-MH-Index operation (MH-Index+1) could be used to overwrite the unreachable primary path. A similar mechanism can be applied to update the PESL when one of the constituent PEs of PESL is not reachable.

Figure 8:
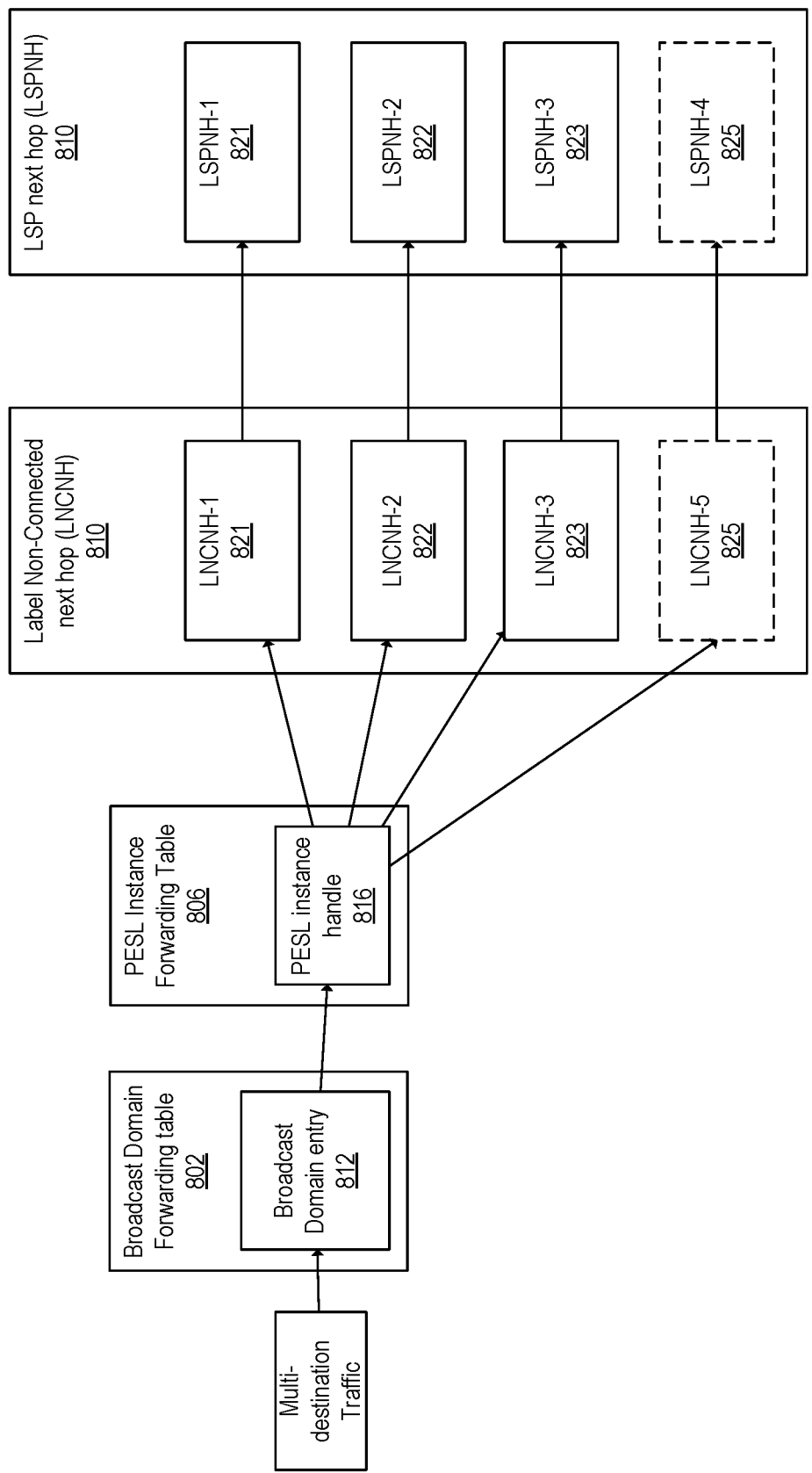
FIG. 8 illustrates a block diagram of a forwarding construct for forwarding multi-destination traffic in accordance with some embodiments.

FIG. 8 illustrates a block diagram of a forwarding construct for forwarding multi-destination traffic in accordance with some embodiments. Multi-destination traffic refers to broadcast, unknown unicast, or multicast (i.e., BUM) traffic, which is received at a network device and needs to be forwarded to one or more network device of a broadcast domain A PESL forwarding construct can be used to forward multi-destination traffic in a Layer 2 broadcast domain. A BUM instance can clone a PESL instance operating in an active status of a single-active mode (i.e., flooding traffic on the components of PESL instance) and inherits PESL attributes (e.g., PESL labels associated with the respective NDs, paths for reaching these NDs, etc.). However, a BUM instance differs at the runtime when cloning to facilitate flooding of BUM traffic. The cloned BUM instance of PESL ignores the mode of operation of the PESL instance (i.e., all-active or single-active) and floods L2 traffic on all constituent towards the remote Layer 2 destination. In some embodiments, in an all-active mode an optimization can be realized by limiting the flooding to a single path. This can be achieved by deriving the replication mechanism from the PESL mode (single-active or all-active). If the mode is single-active, flood on all PESL constituent paths. If mode is all-active, select (a selection mechanism could use configuration options, or L2 header fields, policy or ACLs to determine hashing mechanism) and flood only on one of the constituents of PESL.

When traffic is received, a look up is performed in the broadcast domain forwarding table 802 to determine a broadcast domain entry 812. The broadcast domain entry is used to determine a PESL instance handle 816 of a PESL instance based on the broadcast domain entry. The PESL instance handle is used to determine respective forwarding labels for non-connected next hops (LNCNH). The LNCNH-2 812, LNCNH-3 8 13 and LNCNH-5 814 are PESL labels respectively associated with ND 112, ND 113, and ND 115 for reaching these NDs. These labels are then used to determine a Label Switched Path (LSP) next hop (LSPNH) labels for each one of the non-connected next hops. In this mode of operation, the mode of the PESL instance (all-active or single-active mode) is ignored and traffic is flooded on all the paths of the PESL instance.

Dynamic Update of the PESL Instance and RL2 Instance:

An RL2 instance is a dynamic structure such as updates to the RL2 instance can be made upon detection of an event. In some embodiments, the RL2 instance may be updated in response to the detection of non-reachability of the primary path. In some embodiments, the RL2 instance may be updated in response to a change in a mode of operation of the L2 destination, where the L2 destination transitions from a multi-homed mode of operation to a single-homed mode of operation or vice versa. In other embodiments, the RL2 instance may be updated in response to the detection of an update of the PESL instance. The PESL instance is also a dynamic structure such that one or more PEs can be added at any given time following an initial configuration of the PESL instance. For example, there may be a need to increase the span of multi-homed Layer 2 links of a given instance by adding a PE. Referring back to FIG. 1, for example, ND 115 may be added to the PESL instance 110 at a later time, after the first configuration and creation of the PESL instance. ND 115 may be added to the PESL instance, while data is being forwarded from ND 101 to ND 102 (or from ND 102 to ND 101). Further in other embodiments, a PESL instance can be updated to remove a PE from the set of PEs upon detection that this PE is no longer reachable. In other embodiments, the PESL instance may further transition from a first mode to another mode (for example, the PESL instance can transition from an all-active mode to a single-active mode, or from the single-active to the all-active mode).

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 9:
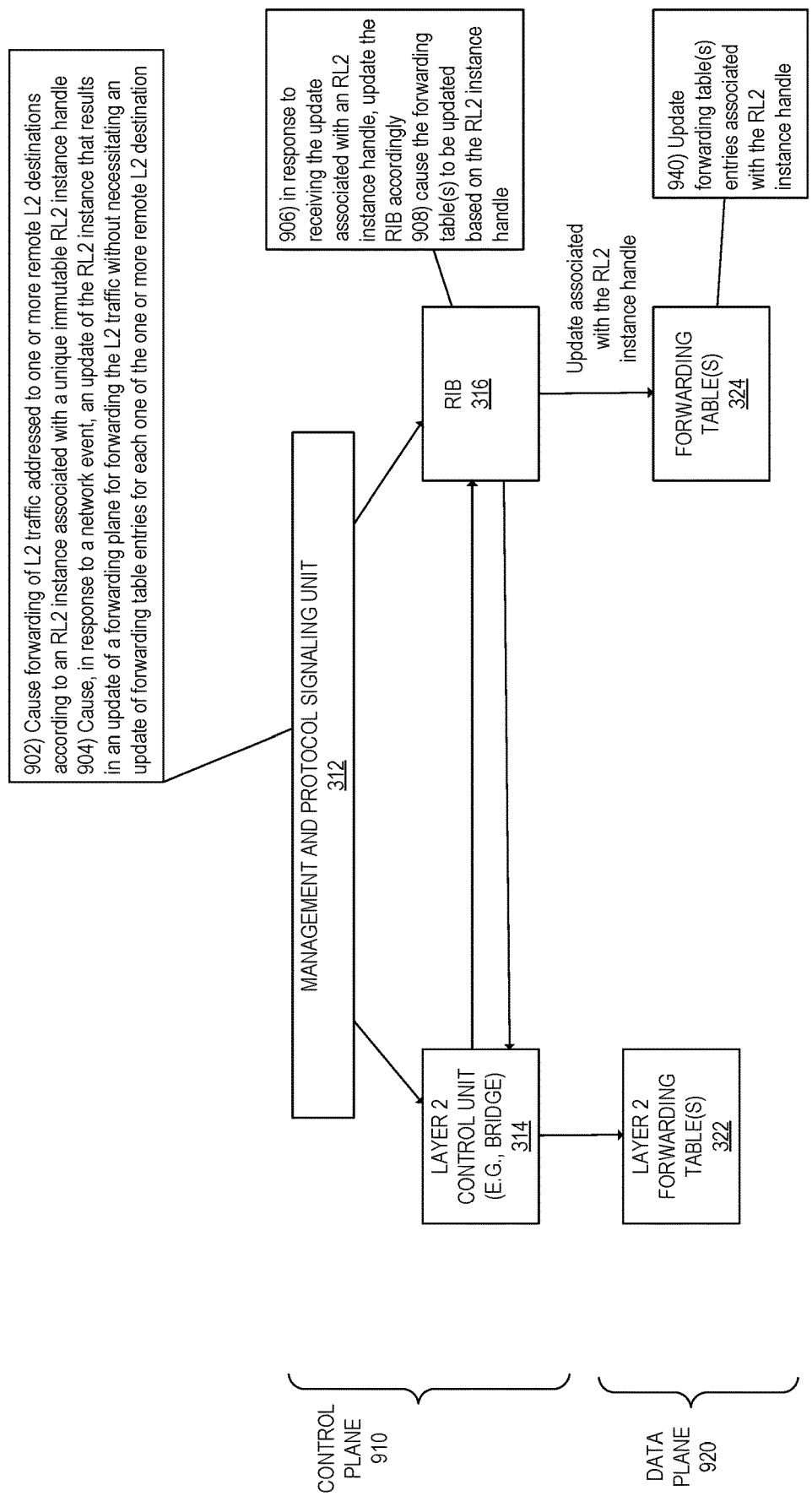
FIG. 9 illustrates a block diagram of a system for updating a Remote Layer 2 instance in response to the detection of a network event in accordance with some embodiments.

FIG. 9 illustrates a block diagram of a system for updating a Remote Layer 2 instance in response to the detection of a network event in accordance with one embodiment. The management and protocol signaling unit 312 causes at operation 902, forwarding of L2 traffic addressed to one or more remote L2 destinations according to an RL2 instance associated with a unique immutable RL2 instance handle. The forwarding of the traffic according to the RL2 instance can be performed as described with the previous FIGS. 1-8. In particular the management and protocol signaling unit 312 configures the network to forward L2 traffic based on an RL2 instance associated with an immutable RL2 instance handle. The RL2 instance is associated with a primary path and, when operating in a multi-homed mode, the RL2 instance is further associated with a PESL instance identified with a PESL instance handle.

At operation 904, the management and protocol signaling unit 312 causes, in response to a network event, an update of the RL2 instance that results in an update of a forwarding plane for forwarding the L2 traffic without necessitating an update of forwarding table entries for each one of the one or more remote L2 destination. At operation 906, in response to receiving the update associated with an RL2 instance handle, the RIB is updated accordingly and causes, at operation 908, the forwarding table(s) of the data plane to be updated based on the RL2 instance handle without requiring an update of an L2 forwarding table entry for each one of the Layer 2 destinations serviced by the RL2 instance.

A network event may be any one of various changes that occur within the network and can be detected with a variety of detection mechanisms according to the type of events that occur. For example, a network event may be an L2 destination that changes from single-homed to multi-homed or vice-versa. When an L2 destination changes from single-homed to multi-homed, the RL2 instance identified with the RL2 instance handle associated with the L2 destination is updated to include the PESL instance. Thus the RIB is updated to include an association between the RL2 instance handle and the unique PESL instance handle identifying the PESL instance. Similarly, the RIB is updated by removing the association between an RL2 instance handle with a PESL instance handle when an L2 destination changes from multi-homed to single-homed. The RIB transmits the updates to the L2 control unit 314 or any other protocol registered to receive updates related to RL2 instances (e.g., BGP, or other routing protocol).

Another example of event can be the non-reachability of a PE. Upon determination that a PE is no longer reachable (due to failure of the PE or failure of the path towards the PE) a reachability and signaling protocol (such as BGP) can update the PEs and associated encapsulation using the unique RL2 instance handle. Such updates will be sequentially propagated (by RIB 316) to the data plane. Such update events can also be propagated to L2 Control Unit 314.

Another example of event can include mode changes of a PESL instance from all-active to single-active and vice versa. These mode changes can be handled without requiring an update of all the associated L2 destinations.

In some embodiments, to facilitate the updates of the RL2 and/or PESL instances, resulting in convergence of the data plane independent of L2 forwarding tables sizes—a composite API is implemented. The composite API creates an indirection satisfying a service type such as PESL or RL2. A PESL created for a given broadcast domain (e.g., a given ESI, VLAN, EVI or Bridge instance). A PESL instance handle is updated via composite API when PEs are added/deleted to the PESL instance. As the underlying PESL instance handle itself is immutable, the forwarding of the L2-destination can refer to a PESL instance handle without being aware of the updates to PESL. Similarly, RL2 updates whether related to primary-PE or mode changes (single-active to all-active and vice versa) will be handled without having to update all the associated thousands of RL2 destinations entries in the L2 forwarding table. By updating the attributes associated (such as set of PEs and their labels) based on the unique handles (PESL instance handle or RL2 instance handle or similar composite-API-handles) a convergence of the control plane and the data plane is achieved as a linear function of the number of PEs while avoiding an update of the L2 forwarding table(s) for each L2 destination entry which would in the order to 100000s or millions of entries.

Architecture

Figure 10A:
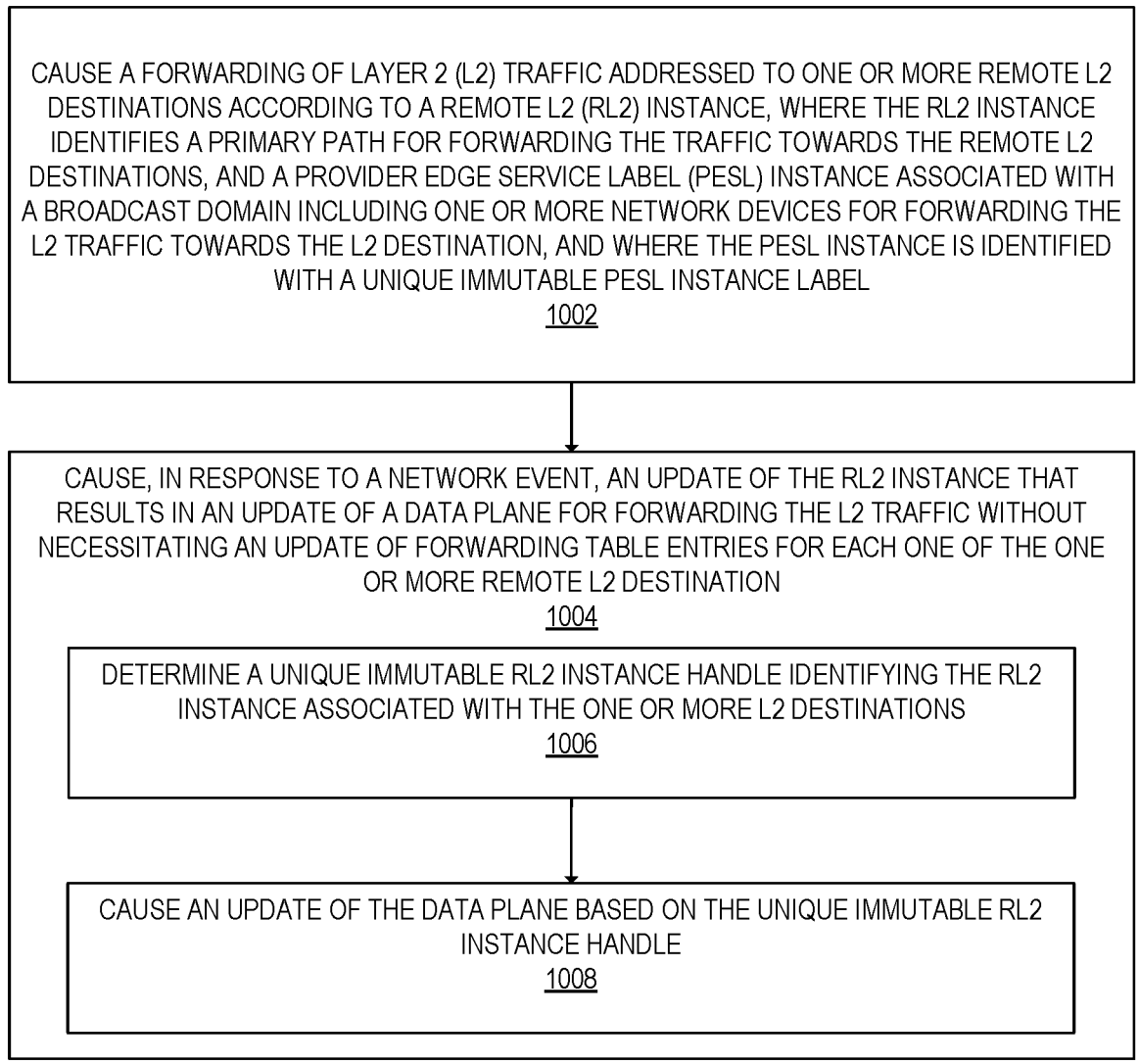
FIG. 10A illustrates a flow of operations for updating a Remote Layer 2 instance in response to the detection of an event in accordance with some embodiments.

FIG. 10A illustrates a flow of operations for updating a Remote Layer 2 instance in response to the detection of an event in accordance with one embodiment. At operation 1002 causing (1002) a forwarding of Layer 2 (L2) traffic addressed to one or more remote L2 destinations according to a remote L2 (RL2) instance associated with a unique immutable RL2 instance handle. The RL2 instance identifies a primary path for forwarding the traffic towards the remote L2 destinations, and a provider edge service label (PESL) instance associated with a broadcast domain including one or more network devices for forwarding the L2 traffic towards the L2 destination. The PESL instance is identified with a unique immutable PESL instance label. The flow of operations then moves to operation 1004, at which, in response to a network event, an update of the RL2 instance is caused. The update of the RL2 instance results in an update of a forwarding plane for forwarding the L2 traffic without necessitating an update of forwarding table entries for each one of the one or more remote L2 destination.

Figure 10B:
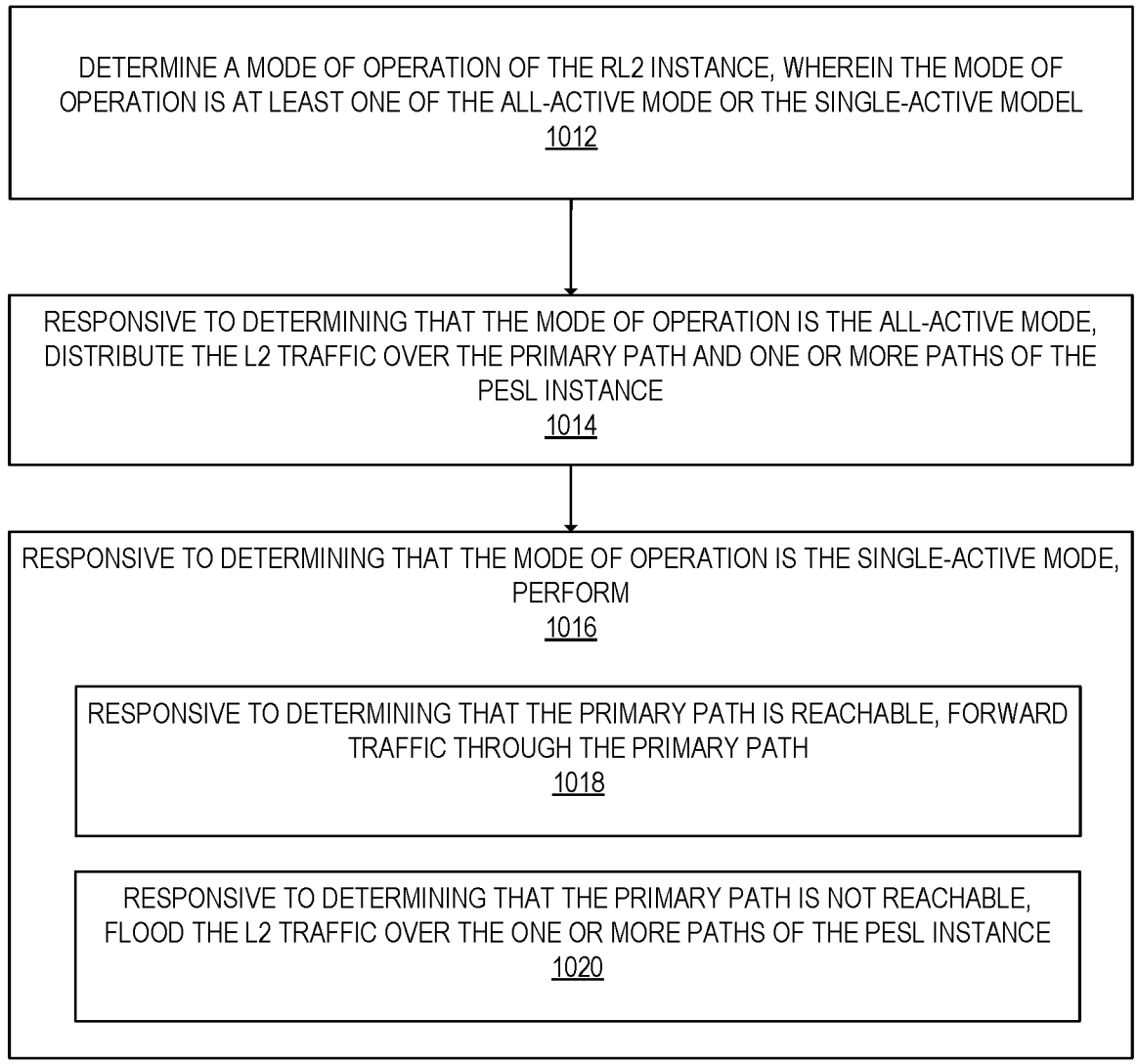
FIG. 10B illustrates a flow of operations for forwarding Layer 2 traffic according to a Remote Layer 2 instance in accordance with some embodiments.

FIG. 10B illustrates a flow of operations for forwarding L2 traffic according to a Remote Layer 2 instance in accordance with one embodiment. At operation 1012, a mode of operation of the RL2 instance is determined, where the mode of operation is at least one of the all-active mode or the single-active model. At operation 1014, responsive to determining that the mode of operation is the all-active mode, the L2 traffic is distributed over the primary path and one or more paths of the PESL instance. At operation 1016, responsive to determining that the mode of operation is the single-active mode, the following operations are performed: responsive to determining that the primary path is reachable, traffic is forwarded (operation 1018) through the primary path, responsive to determining that the primary path is not reachable, the L2 traffic is flooded (operation 1020) over the one or more paths of the PESL instance.

The embodiments of the present invention present clear advantages with respect to prior art approaches. The present embodiments, enable an easy L2 forwarding table setup L2 overlay networks through the use of remote L2 construct. The embodiments, enable control plane and data plane convergence independent of the size of L2 tables, and independent of the number of MAC destinations needing PE updates. Furthermore the new forwarding plane constructs are made immutable so that addition or deletion of alternate paths does not alter the identifier used to locate the said forwarding construct. The new forwarding construct which is used to identify the alternate paths, referred to as PESL (Provider Edge Service Label), in combination with the primary path forwarding construct of the L2 destination forms an immutable forwarding construct, referred to as RL2. And a set of L2 destinations can be reachable via an RL2. RL2 identifier remain immutable for a given primary path. Irrespective of changes to alternate paths both the identifiers of PESL and RL2 are immutable. Updating PESL instances and RL2 instances is sufficient to update any changes to alternate paths without the need of an update of the L2 forwarding table for each L2 destination. Furthermore by conveying the RL2 to the source of L2 primary path (such as SDN or BGP), any further changes to the reachability of the primary path of the set of L2 destinations can be affected by updating RL2 transparently without having to update all the associated L2 destinations in an L2 forwarding table.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 11A:
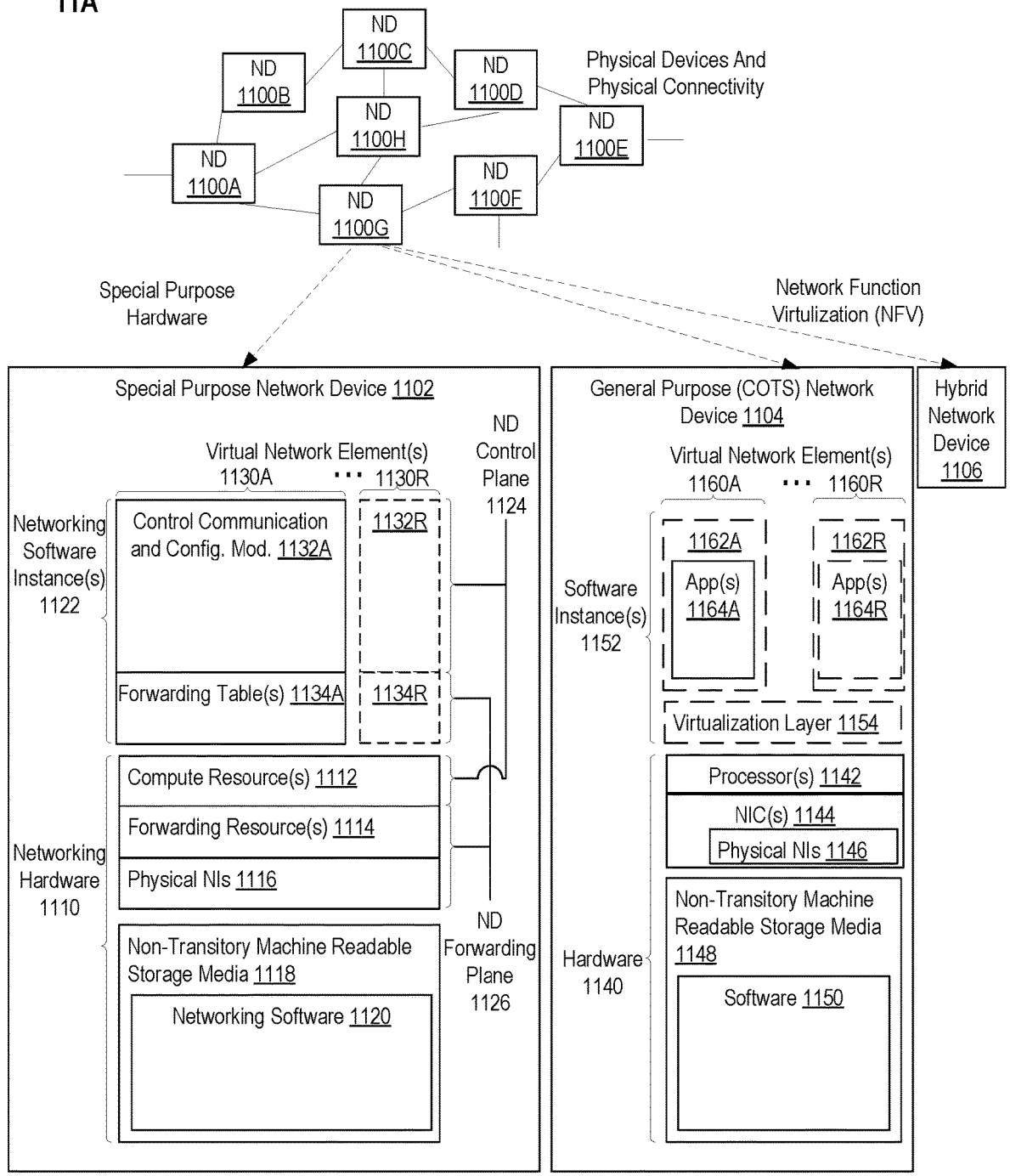
FIG. 11A illustrates connectivity between network devices (NDs) within an exemplary network, as well as three exemplary implementations of the NDs, according to some embodiments of the invention.

FIG. 11A illustrates connectivity between network devices (NDs) within an exemplary network, as well as three exemplary implementations of the NDs, according to some embodiments of the invention. FIG. 11A shows NDs 1100A-H, and their connectivity by way of lines between 1100A-1100B, 1100B-1100C, 1100C-1100D, 1100D-1100E, 1100E-1100F, 1100F-1100G, and 1100A-1100G, as well as between 1100H and each of 1100A, 1100C, 1100D, and 1100G. These NDs are physical devices, and the connectivity between these NDs can be wireless or wired (often referred to as a link). An additional line extending from NDs 1100A, 1100E, and 1100F illustrates that these NDs act as ingress and egress points for the network (and thus, these NDs are sometimes referred to as edge NDs; while the other NDs may be called core NDs).

Two of the exemplary ND implementations in FIG. 11A are: 1) a special-purpose network device 1102 that uses custom application—specific integrated—circuits (ASICs) and a special-purpose operating system (OS); and 2) a general purpose network device 1104 that uses common off-the-shelf (COTS) processors and a standard OS.

The special-purpose network device 1102 includes networking hardware 1110 comprising compute resource(s) 1112 (which typically include a set of one or more processors), forwarding resource(s) 1114 (which typically include one or more ASICs and/or network processors), and physical network interfaces (NIs) 1116 (sometimes called physical ports), as well as non-transitory machine readable storage media 1118 having stored therein networking software 1120. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1100A-H. During operation, the networking software 1120 may be executed by the networking hardware 1110 to instantiate a set of one or more networking software instance(s) 1122. Each of the networking software instance(s) 1122, and that part of the networking hardware 1110 that executes that network software instance (be it hardware dedicated to that networking software instance and/or time slices of hardware temporally shared by that networking software instance with others of the networking software instance(s) 1122), form a separate virtual network element 1130A-R. Each of the virtual network element(s) (VNEs) 1130A-R includes a control communication and configuration module 1132A-R (sometimes referred to as a local control module or control communication module) and forwarding table(s) 1134A-R, such that a given virtual network element (e.g., 1130A) includes the control communication and configuration module (e.g., 1132A), a set of one or more forwarding table(s) (e.g., 1134A), and that portion of the networking hardware 1110 that executes the virtual network element (e.g., 1130A).

The special-purpose network device 1102 is often physically and/or logically considered to include: 1) a ND control plane 1124 (sometimes referred to as a control plane) comprising the compute resource(s) 1112 that execute the control communication and configuration module(s) 1132A-R; and 2) a ND forwarding plane 1126 (sometimes referred to as a forwarding plane, a data plane, or a media plane) comprising the forwarding resource(s) 1114 that utilize the forwarding table(s) 1134A-R and the physical NIs 1116. By way of example, where the ND is a router (or is implementing routing functionality), the ND control plane 1124 (the compute resource(s) 1112 executing the control communication and configuration module(s) 1132A-R) is typically responsible for participating in controlling how data (e.g., packets) is to be routed (e.g., the next hop for the data and the outgoing physical NI for that data) and storing that routing information in the forwarding table(s) 1134A-R, and the ND forwarding plane 1126 is responsible for receiving that data on the physical NIs 1116 and forwarding that data out the appropriate ones of the physical NIs 1116 based on the forwarding table(s) 1134A-R.

Figure 11B:
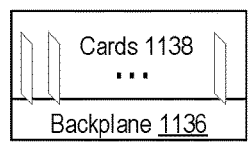
FIG. 11B illustrates an exemplary way to implement a special-purpose network device according to some embodiments of the invention.

FIG. 11B illustrates an exemplary way to implement the special-purpose network device 1102 according to some embodiments of the invention. FIG. 11B shows a special-purpose network device including cards 1138 (typically hot pluggable). While in some embodiments the cards 1138 are of two types (one or more that operate as the ND forwarding plane 1126 (sometimes called line cards), and one or more that operate to implement the ND control plane 1124 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1136 (e.g., a first full mesh coupling the line cards and a second full mesh coupling all of the cards).

Returning to FIG. 11A, the general purpose network device 1104 includes hardware 1140 comprising a set of one or more processor(s) 1142 (which are often COTS processors) and network interface controller(s) 1144 (NICs; also known as network interface cards) (which include physical NIs 1146), as well as non-transitory machine readable storage media 1148 having stored therein software 1150. During operation, the processor(s) 1142 execute the software 1150 to instantiate one or more sets of one or more applications 1164A-R. While one embodiment does not implement virtualization, alternative embodiments may use different forms of virtualization. For example, in one such alternative embodiment the virtualization layer 1154 represents the kernel of an operating system (or a shim executing on a base operating system) that allows for the creation of multiple instances 1162A-R called software containers that may each be used to execute one (or more) of the sets of applications 1164A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1154 represents a hypervisor (sometimes referred to as a virtual machine monitor (VMM)) or a hypervisor executing on top of a host operating system, and each of the sets of applications 1164A-R is run on top of a guest operating system within an instance 1162A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1140, directly on a hypervisor (in which case the unikernel is sometimes described as running within a LibOS virtual machine), or in a software container, embodiments can be implemented fully with unikernels running directly on a hypervisor represented by virtualization layer 1154, unikernels running within software containers represented by instances 1162A-R, or as a combination of unikernels and the above-described techniques (e.g., unikernels and virtual machines both run directly on a hypervisor, unikernels and sets of applications that are run in different software containers).

The instantiation of the one or more sets of one or more applications 1164A-R, as well as virtualization if implemented, are collectively referred to as software instance(s) 1152. Each set of applications 1164A-R, corresponding virtualization construct (e.g., instance 1162A-R) if implemented, and that part of the hardware 1140 that executes them (be it hardware dedicated to that execution and/or time slices of hardware temporally shared), forms a separate virtual network element(s) 1160A-R.

The virtual network element(s) 1160A-R perform similar functionality to the virtual network element(s) 1130A-R—e.g., similar to the control communication and configuration module(s) 1132A and forwarding table(s) 1134A (this virtualization of the hardware 1140 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1162A-R corresponding to one VNE 1160A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1162A-R to VNEs also apply to embodiments where such a finer level of granularity and/or unikernels are used.

In certain embodiments, the virtualization layer 1154 includes a virtual switch that provides similar forwarding services as a physical Ethernet switch. Specifically, this virtual switch forwards traffic between instances 1162A-R and the NIC(s) 1144, as well as optionally between the instances 1162A-R; in addition, this virtual switch may enforce network isolation between the VNEs 1160A-R that by policy are not permitted to communicate with each other (e.g., by honoring virtual local area networks (VLANs)).

The third exemplary ND implementation in FIG. 11A is a hybrid network device 1106, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1102) could provide for para-virtualization to the networking hardware present in the hybrid network device 1106.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1130A-R, VNEs 1160A-R, and those in the hybrid network device 1106) receives data on the physical NIs (e.g., 1116, 1146) and forwards that data out the appropriate ones of the physical NIs (e.g., 1116, 1146). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

A virtual network is a logical abstraction of a physical network (such as that in FIG. 11A) that provides network services (e.g., L2 and/or L3 services). A virtual network can be implemented as an overlay network (sometimes referred to as a network virtualization overlay) that provides network services (e.g., Layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), Layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 11C:
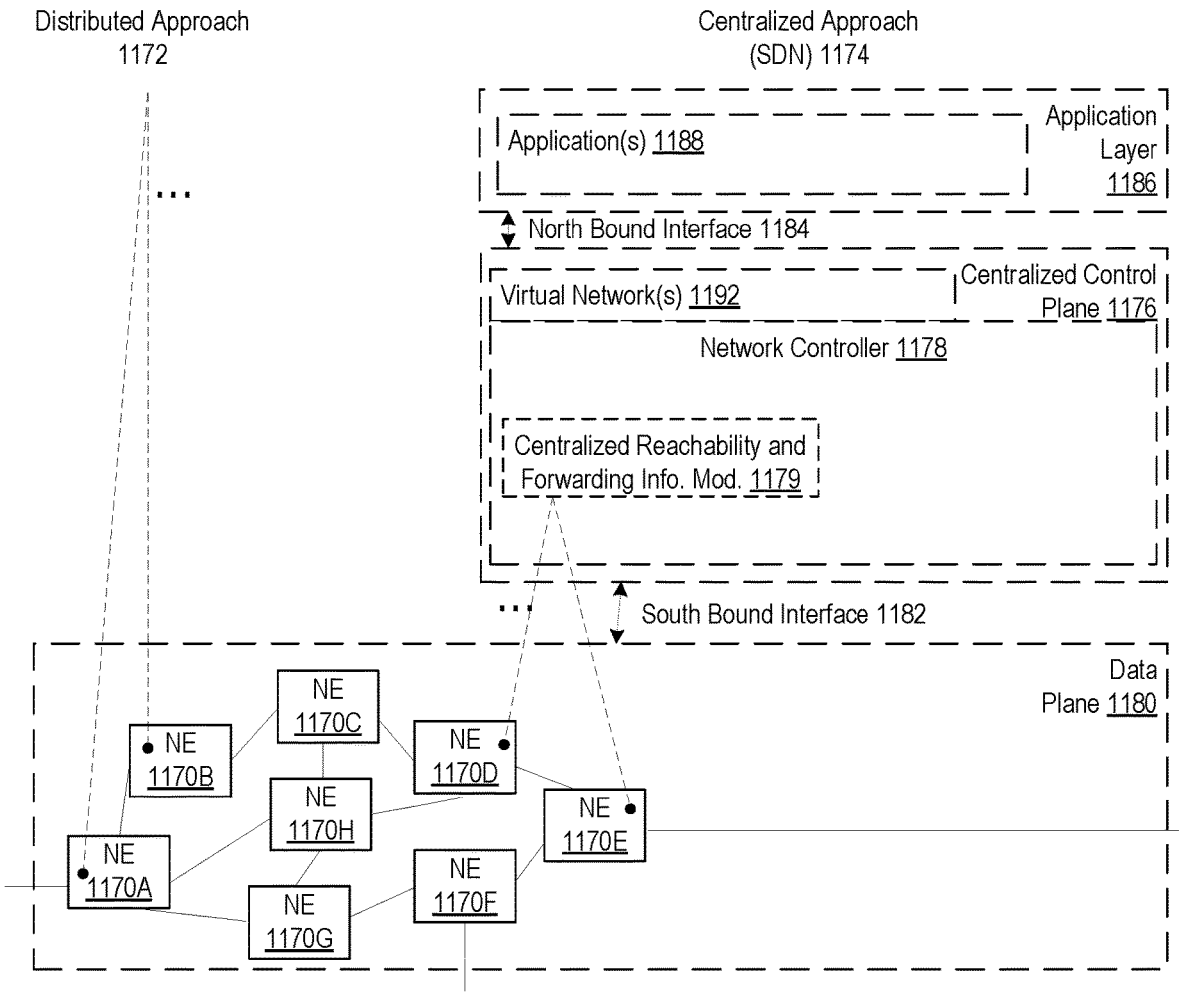
FIG. 11C illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 11C illustrates a network with a single network element on each of the NDs of FIG. 11A, and within this straight forward approach contrasts a traditional distributed approach (commonly used by traditional routers) with a centralized approach for maintaining reachability and forwarding information (also called network control), according to some embodiments of the invention. Specifically, FIG. 11C illustrates network elements (NEs) 1170A-H with the same connectivity as the NDs 1100A-H of FIG. 11A.

FIG. 11C illustrates that the distributed approach 1172 distributes responsibility for generating the reachability and forwarding information across the NEs 1170A-H; in other words, the process of neighbor discovery and topology discovery is distributed.

For example, where the special-purpose network device 1102 is used, the control communication and configuration module(s) 1132A-R of the ND control plane 1124 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1170A-H (e.g., the compute resource(s) 1112 executing the control communication and configuration module(s) 1132A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1124. The ND control plane 1124 programs the ND forwarding plane 1126 with information (e.g., adjacency and route information) based on the routing structure(s). For example, the ND control plane 1124 programs the adjacency and route information into one or more forwarding table(s) 1134A-R (e.g., Forwarding Information Base (FIB), Label Forwarding Information Base (LFIB), and one or more adjacency structures) on the ND forwarding plane 1126. For Layer 2 forwarding, the ND can store one or more bridging tables that are used to forward data based on the Layer 2 information in that data. While the above example uses the special-purpose network device 1102, the same distributed approach 1172 can be implemented on the general purpose network device 1104 and the hybrid network device 1106.

FIG. 11C illustrates that a centralized approach 1174 (also known as software defined networking (SDN)) that decouples the system that makes decisions about where traffic is sent from the underlying systems that forwards traffic to the selected destination. The illustrated centralized approach 1174 has the responsibility for the generation of reachability and forwarding information in a centralized control plane 1176 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1176 has a south bound interface 1182 with a data plane 1180 (sometime referred to the infrastructure layer, network forwarding plane, or forwarding plane (which should not be confused with a ND forwarding plane)) that includes the NEs 1170A-H (sometimes referred to as switches, forwarding elements, data plane elements, or nodes). The centralized control plane 1176 includes a network controller 1178, which includes a centralized reachability and forwarding information module 1179 that determines the reachability within the network and distributes the forwarding information to the NEs 1170A-H of the data plane 1180 over the south bound interface 1182 (which may use the OpenFlow protocol). Thus, the network intelligence is centralized in the centralized control plane 1176 executing on electronic devices that are typically separate from the NDs.

For example, where the special-purpose network device 1102 is used in the data plane 1180, each of the control communication and configuration module(s) 1132A-R of the ND control plane 1124 typically include a control agent that provides the VNE side of the south bound interface 1182. In this case, the ND control plane 1124 (the compute resource(s) 1112 executing the control communication and configuration module(s) 1132A-R) performs its responsibility for participating in controlling how data (e.g., packets) is to be routed (e.g., the next hop for the data and the outgoing physical NI for that data) through the control agent communicating with the centralized control plane 1176 to receive the forwarding information (and in some cases, the reachability information) from the centralized reachability and forwarding information module 1179 (it should be understood that in some embodiments of the invention, the control communication and configuration module(s) 1132A-R, in addition to communicating with the centralized control plane 1176, may also play some role in determining reachability and/or calculating forwarding information—albeit less so than in the case of a distributed approach; such embodiments are generally considered to fall under the centralized approach 1174, but may also be considered a hybrid approach).

While the above example uses the special-purpose network device 1102, the same centralized approach 1174 can be implemented with the general purpose network device 1104 (e.g., each of the VNE 1160A-R performs its responsibility for controlling how data (e.g., packets) is to be routed (e.g., the next hop for the data and the outgoing physical NI for that data) by communicating with the centralized control plane 1176 to receive the forwarding information (and in some cases, the reachability information) from the centralized reachability and forwarding information module 1179; it should be understood that in some embodiments of the invention, the VNEs 1160A-R, in addition to communicating with the centralized control plane 1176, may also play some role in determining reachability and/or calculating forwarding information—albeit less so than in the case of a distributed approach) and the hybrid network device 1106. In fact, the use of SDN techniques can enhance the NFV techniques typically used in the general purpose network device 1104 or hybrid network device 1106 implementations as NFV is able to support SDN by providing an infrastructure upon which the SDN software can be run, and NFV and SDN both aim to make use of commodity server hardware and physical switches.

FIG. 11C also shows that the centralized control plane 1176 has a north bound interface 1184 to an application layer 1186, in which resides application(s) 1188. The centralized control plane 1176 has the ability to form virtual networks 1192 (sometimes referred to as a logical forwarding plane, network services, or overlay networks (with the NEs 1170A-H of the data plane 1180 being the underlay network)) for the application(s) 1188. Thus, the centralized control plane 1176 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 11C shows the distributed approach 1172 separate from the centralized approach 1174, the effort of network control may be distributed differently or the two combined in certain embodiments of the invention. For example: 1) embodiments may generally use the centralized approach (SDN) 1174, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1174, but may also be considered a hybrid approach.

While some embodiments of the invention implement the centralized control plane 1176 as a single entity (e.g., a single instance of software running on a single electronic device), alternative embodiments may spread the functionality across multiple entities for redundancy and/or scalability purposes (e.g., multiple instances of software running on different electronic devices).

Figure 12:
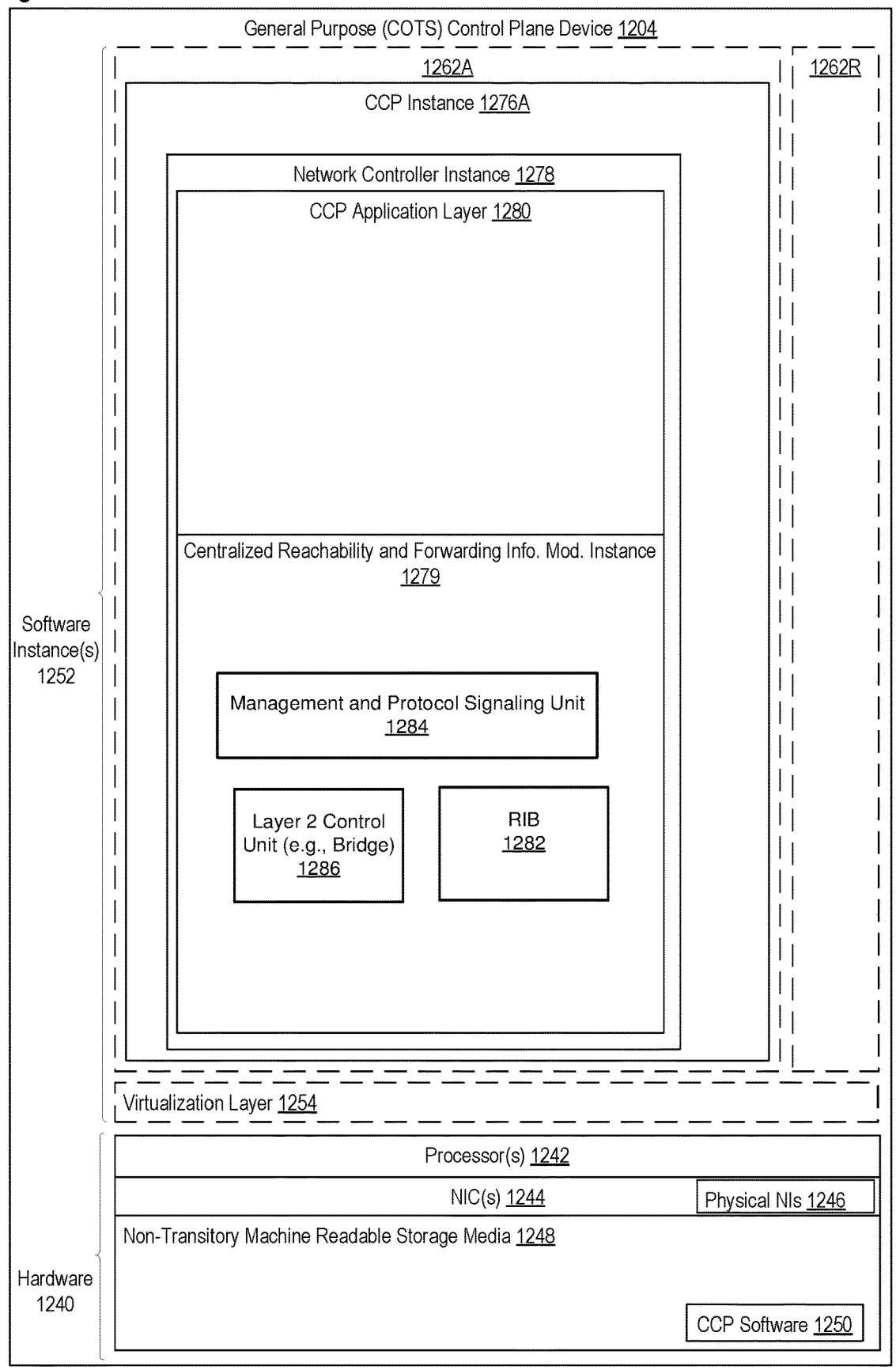
FIG. 12 illustrates a general purpose control plane device with centralized control plane (CCP) software 1250), according to some embodiments of the invention.

Similar to the network device implementations, the electronic device(s) running the centralized control plane 1176, and thus the network controller 1178 including the centralized reachability and forwarding information module 1179, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 12 illustrates, a general purpose control plane device 1204 including hardware 1240 comprising a set of one or more processor(s) 1242 (which are often COTS processors) and network interface controller(s) 1244 (NICs; also known as network interface cards) (which include physical NIs 1246), as well as non-transitory machine readable storage media 1248 having stored therein centralized control plane (CCP) software 1250.

In embodiments that use compute virtualization, the processor(s) 1242 typically execute software to instantiate a virtualization layer 1254 (e.g., in one embodiment the virtualization layer 1254 represents the kernel of an operating system (or a shim executing on a base operating system) that allows for the creation of multiple instances 1262A-R called software containers (representing separate user spaces and also called virtualization engines, virtual private servers, or jails) that may each be used to execute a set of one or more applications; in another embodiment the virtualization layer 1254 represents a hypervisor (sometimes referred to as a virtual machine monitor (VMM)) or a hypervisor executing on top of a host operating system, and an application is run on top of a guest operating system within an instance 1262A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by application, and the unikernel can run directly on hardware 1240, directly on a hypervisor represented by virtualization layer 1254 (in which case the unikernel is sometimes described as running within a LibOS virtual machine), or in a software container represented by one of instances 1262A-R). Again, in embodiments where compute virtualization is used, during operation an instance of the CCP software 1250 (illustrated as CCP instance 1276A) is executed (e.g., within the instance 1262A) on the virtualization layer 1254. In embodiments where compute virtualization is not used, the CCP instance 1276A is executed, as a unikernel or on top of a host operating system, on the "bare metal" general purpose control plane device 1204. The instantiation of the CCP instance 1276A, as well as the virtualization layer 1254 and instances 1262A-R if implemented, are collectively referred to as software instance(s) 1252.

In some embodiments, the CCP instance 1276A includes a network controller instance 1278. The network controller instance 1278 includes a centralized reachability and forwarding information module instance 1279 (which is a middleware layer providing the context of the network controller 1178 to the operating system and communicating with the various NEs), and an CCP application layer 1280 (sometimes referred to as an application layer) over the middleware layer (providing the intelligence required for various network operations such as protocols, network situational awareness, and user—interfaces). At a more abstract level, this CCP application layer 1280 within the centralized control plane 1176 works with virtual network view(s) (logical view(s) of the network) and the middleware layer provides the conversion from the virtual networks to the physical view.

The centralized control plane 1176 transmits relevant messages to the data plane 1180 based on CCP application layer 1280 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1180 may receive different messages, and thus different forwarding information. The data plane 1180 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets.

The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1180, the packet (or a subset of the packet header and content) is typically forwarded to the centralized control plane 1176. The centralized control plane 1176 will then program forwarding table entries into the data plane 1180 to accommodate packets belonging to the flow of the unknown packet. Once a specific forwarding table entry has been programmed into the data plane 1180 by the centralized control plane 1176, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of Layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

An Ethernet Virtual Private Network (EVPN) is a type of VPN technology which introduces routing Media Access Control (MAC) addresses using Multiprotocol Border Gateway Protocol (MP-BGP) over Multiprotocol Label Switching (MPLS). As with other types of VPNs, an EVPN is comprised of customer edge (CE) devices (host, router, or switch) connected to provider edge (PE) devices that form the edge of an MPLS infrastructure. A CE may be a host, a router, or a switch. The PEs provide virtual Layer 2 bridged connectivity between the CEs. There may be multiple EVPN instances in the provider's network. The PEs may be connected by an MPLS Label Switched Path (LSP) infrastructure, which provides the benefits of MPLS technology, such as fast reroute, resiliency, etc. The PEs may also be connected by an IP infrastructure, in which case IP/GRE (Generic Routing Encapsulation) tunneling or other IP tunneling can be used between the PEs. The CEs can connect to multiple active points of attachment (i.e., to multiple PEs).

In EVPN, PEs advertise the MAC addresses learned from the CEs that are connected to them, along with an MPLS label to other PEs in the control plane using BGP. Control-plane route learning through MP-BGP, offers greater control over a MAC route learning process, and enables the introduction of restriction on which device learns which information as well as the ability to apply policies. It further enables load balancing of traffic to and from CEs that are multi-homed to multiple PEs and improves convergence times in the event of certain network failures.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting. For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

What is claimed is:

1. A method for fast convergence in Layer 2 Overlay network, the method comprising:
   causing a forwarding of Layer 2 (L2) traffic addressed to one or more remote L2 destinations according to a remote L2 (RL2) instance, wherein the RL2 instance identifies a primary path for forwarding the traffic towards the remote L2 destinations, and a provider edge service label (PESL) instance associated with a broadcast domain including one or more network devices for forwarding the L2 traffic towards the L2 destination, and wherein the PESL instance is identified with a unique immutable PESL instance label; and
   causing, in response to a network event, an update of the RL2 instance that results in an update of a data plane for forwarding the L2 traffic without necessitating an update of forwarding table entries for each one of the one or more remote L2 destinations.

2. The method of claim 1, wherein causing, in response to a network event, the update of the RL2 instance includes:
   determining a unique immutable RL2 instance handle identifying the RL2 instance associated with the one or more L2 destinations; and
   causing an update of the data plane based on the unique immutable RL2 instance handle.

3. The method of claim 1, wherein forwarding L2 traffic according to the RL2 instance includes:
   determining a mode of operation of the RL2 instance, wherein the mode of operation is at least one of an all-active mode or a single-active model;
   responsive to determining that the mode of operation is the all-active mode, distributing the L2 traffic over the primary path and one or more paths of the PESL instance; and
   responsive to determining that the mode of operation is the single-active mode, performing the following:
      responsive to determining that the primary path is reachable, forwarding traffic through the primary path,
      responsive to determining that the primary path is not reachable, flooding the L2 traffic over the one or more paths of the PESL instance.

4. The method of claim 1, wherein the network event is caused by an L2 destination transitioning from being a multi-homed destination to a single-homed destination.

5. The method of claim 1, wherein the network event is caused by an L2 destination transitioning from being a single-homed destination to a multi-homed destination.

6. The method of claim 1, wherein the network event is caused by an update to the PESL instance.

7. The method of claim 6, wherein the update of the PESL instance includes adding an additional path to the PESL instance.

8. A non-transitory computer readable storage medium that provides instructions, which when executed by one or more processors, cause the one or more processors to perform operations enabling a fast control path and data path convergence in Layer 2 overlay networks, the operations comprising:
   causing a forwarding of Layer 2 (L2) traffic addressed to one or more remote L2 destinations according to a remote L2 (RL2) instance, wherein the RL2 instance identifies a primary path for forwarding the traffic towards the remote L2 destinations, and a provider edge service label (PESL) instance associated with a broadcast domain including one or more network devices for forwarding the L2 traffic towards the L2 destination, and wherein the PESL instance is identified with a unique immutable PESL instance label; and
   causing, in response to a network event, an update of the RL2 instance that results in an update of a data plane for forwarding the L2 traffic without necessitating an update of forwarding table entries for each one of the one or more remote L2 destination.

9. The non-transitory computer readable storage medium of claim 8, wherein causing, in response to a network event, the update of the RL2 instance includes:
   determining a unique immutable RL2 instance handle identifying the RL2 instance associated with the one or more L2 destinations; and
   causing an update of the data plane based on the unique immutable RL2 instance handle.

10. The non-transitory computer readable storage medium of claim 8, wherein forwarding L2 traffic according to the RL2 instance includes:
   determining a mode of operation of the RL2 instance, wherein the mode of operation is at least one of an all-active mode or a single-active model;

responsive to determining that the mode of operation is the all-active mode, distributing the L2 traffic over the primary path and one or more paths of the PESL instance; and responsive to determining that the mode of operation is the single-active mode, performing the following:
  responsive to determining that the primary path is reachable, forwarding traffic through the primary path,
  responsive to determining that the primary path is not reachable, flooding the L2 traffic over the one or more paths of the PESL instance.

11. The non-transitory computer readable storage medium of claim 8, wherein the network event is caused by an L2 destination transitioning from being a multi-homed destination to a single-homed destination.

12. The non-transitory computer readable storage medium of claim 8, wherein the network event is caused by an L2 destination transitioning from being a single-homed destination to a multi-homed destination.

13. The non-transitory computer readable storage medium of claim 8, wherein the network event is caused by an update to the PESL instance.

14. The non-transitory computer readable storage medium of claim 13, wherein the update of the PESL instance includes adding an additional path to the PESL instance.

* * * * *